(12) United States Patent
Nguyen

(10) Patent No.: US 7,934,557 B2
(45) Date of Patent: May 3, 2011

(54) METHODS OF COMPLETING WELLS FOR CONTROLLING WATER AND PARTICULATE PRODUCTION

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 354 days.

(21) Appl. No.: 11/706,737

(22) Filed: Feb. 15, 2007

(65) Prior Publication Data
US 2008/0196897 A1    Aug. 21, 2008

(51) Int. Cl.
*E21B 33/13*    (2006.01)
(52) U.S. Cl. ................. 166/295; 166/285; 166/294
(58) Field of Classification Search .................. None
See application file for complete search history.

(56) References Cited

U.S. PATENT DOCUMENTS

| | | |
|---|---|---|
| 2,238,671 A | 4/1941 | Woodhouse |
| 2,278,838 A | 4/1942 | Groote et al. |
| 2,670,329 A | 2/1954 | Jones |
| 2,689,244 A | 9/1954 | Jones |
| 2,703,316 A | 3/1955 | Schneider |
| 2,819,278 A | 1/1958 | De Groots et al. |
| 2,843,573 A | 7/1958 | Melamed |
| 2,863,832 A | 12/1958 | Perrine |
| 2,869,642 A | 1/1959 | McKay et al. |
| 2,877,179 A | 3/1959 | Hughes et al. |
| 2,910,436 A | 10/1959 | Fatt et al. |
| 3,008,898 A | 11/1961 | Hughes et al. |
| 3,047,067 A | 7/1962 | Williams et al. |
| 3,052,298 A | 9/1962 | Mallot |
| 3,065,247 A | 11/1962 | De Groots et al. |
| 3,070,165 A | 12/1962 | Stratton |
| 3,123,138 A | 3/1964 | Robichaux |
| 3,173,484 A | 3/1965 | Huitt et al. |
| 3,176,768 A | 4/1965 | Brandt et al. |
| 3,187,567 A * | 6/1965 | O'Brien et al. ............. 73/152.18 |
| 3,195,635 A | 7/1965 | Fast |
| 3,199,590 A | 8/1965 | Young |
| 3,215,199 A | 11/1965 | Dilgren |
| 3,237,690 A * | 3/1966 | Karp et al. .................... 166/281 |

(Continued)

FOREIGN PATENT DOCUMENTS

CA    2063877    9/1992

(Continued)

OTHER PUBLICATIONS

B.R. Reddy, Larry Eoff, E. Dwyann Dalrymple, and David Brown, Natural Polymer-Based Compositions Designed for Use in Conformance Gel Systems, Dec. 2005 SPE Journal, pp. 385-393.

(Continued)

*Primary Examiner* — Zakiya W Bates
*Assistant Examiner* — Angela M Ditrani
(74) *Attorney, Agent, or Firm* — Robert A. Kent; McDermott Will & Emery LLP

(57) ABSTRACT

Disclosed embodiments relate to methods of completing wells in subterranean formations. An exemplary embodiment comprises forming an artificial barrier to water flow, wherein the artificial barrier is located at or above a hydrocarbon-water interface between a water-bearing formation zone and a hydrocarbon-bearing formation zone. The exemplary embodiment further comprises consolidating a portion of the hydrocarbon-bearing formation zone, wherein the artificial barrier is located between the consolidated portion of the hydrocarbon-bearing formation zone and the water-bearing formation zone.

34 Claims, 4 Drawing Sheets

U.S. PATENT DOCUMENTS

| | | | |
|---|---|---|---|
| 3,251,415 A | 5/1966 | Bombardieri et al. | |
| 3,251,778 A | 5/1966 | Dickson et al. | |
| 3,258,428 A | 6/1966 | Dickson et al. | |
| 3,265,512 A | 8/1966 | Dickson et al. | |
| 3,271,307 A | 9/1966 | Dickson et al. | |
| 3,272,650 A | 9/1966 | MacVittie | |
| 3,297,086 A | 1/1967 | Spain | |
| 3,297,090 A | 1/1967 | Dilgren | |
| 3,302,719 A | 2/1967 | Fischer | |
| 3,307,630 A | 3/1967 | Dilgren et al. | |
| 3,308,885 A | 3/1967 | Sandiford | |
| 3,308,886 A | 3/1967 | Evans | |
| 3,316,965 A | 5/1967 | Watanabe | |
| 3,326,890 A | 6/1967 | Engelskirchen et at | |
| 3,329,204 A | 7/1967 | Brieger | |
| 3,336,980 A | 8/1967 | Rike | |
| 3,347,789 A | 10/1967 | Dickson et al. | |
| 3,364,995 A | 1/1968 | Atkins et al. | |
| 3,366,178 A | 1/1968 | Malone et al. | |
| 3,375,872 A | 4/1968 | McLaughlin et al. | |
| 3,378,074 A | 4/1968 | Kiel | |
| 3,382,924 A | 5/1968 | Veley et al. | |
| 3,394,758 A * | 7/1968 | Terry et al. | 166/292 |
| 3,404,114 A | 10/1968 | Snyder et al. | |
| 3,404,735 A | 10/1968 | Young et al. | |
| 3,415,320 A | 12/1968 | Young | |
| 3,434,971 A | 3/1969 | Atkins | |
| 3,441,085 A | 4/1969 | Gidley | |
| 3,451,818 A | 6/1969 | Wareham | |
| 3,455,390 A | 7/1969 | Gallus | |
| 3,478,824 A | 11/1969 | Hess et al. | |
| 3,481,403 A | 12/1969 | Gidley et al. | |
| 3,489,222 A | 1/1970 | Millhone et al. | |
| 3,492,147 A | 1/1970 | Young et al. | |
| 3,525,398 A | 8/1970 | Fisher | |
| 3,565,176 A | 2/1971 | Clifford | |
| 3,592,266 A | 7/1971 | Tinsley | |
| 3,601,194 A | 8/1971 | Gallus | |
| 3,647,507 A | 3/1972 | Ashcraft | |
| 3,647,567 A | 3/1972 | Schweri | |
| 3,659,651 A | 5/1972 | Graham | |
| 3,681,287 A | 8/1972 | Brown et al. | |
| 3,689,418 A | 9/1972 | Cenci et al. | |
| 3,689,468 A | 9/1972 | Warminster | |
| 3,708,013 A | 1/1973 | Dismukes | |
| 3,709,298 A | 1/1973 | Pramann | |
| 3,709,641 A | 1/1973 | Sarem | |
| 3,741,308 A | 6/1973 | Veley | |
| 3,744,566 A | 7/1973 | Szabo et al. | |
| 3,754,598 A | 8/1973 | Holloway, Jr. | |
| 3,765,804 A | 10/1973 | Brandon | |
| 3,768,564 A | 10/1973 | Knox et al. | |
| 3,769,070 A | 10/1973 | Schilt | |
| 3,784,585 A | 1/1974 | Schmitt et al. | |
| 3,819,525 A | 6/1974 | Hattenbrun | |
| 3,842,911 A | 10/1974 | Knox et al. | |
| 3,850,247 A | 11/1974 | Tinsley | |
| 3,854,533 A | 12/1974 | Gurley et al. | |
| 3,857,444 A | 12/1974 | Copeland | |
| 3,861,467 A | 1/1975 | Harnsberger | |
| 3,863,709 A | 2/1975 | Fitch | |
| 3,865,600 A | 2/1975 | Pearson et al. | 106/84 |
| 3,888,311 A | 6/1975 | Cooke, Jr. | |
| 3,902,557 A | 9/1975 | Shaughnessy et al. | |
| 3,910,862 A | 10/1975 | Barabas et al. | |
| 3,912,692 A | 10/1975 | Casey et al. | |
| 3,933,205 A | 1/1976 | Kiel | |
| 3,943,060 A | 3/1976 | Martin et al. | |
| 3,948,672 A | 4/1976 | Harnsberger | |
| 3,955,993 A | 5/1976 | Curtice et al. | |
| 3,983,941 A | 10/1976 | Fitch | |
| 4,000,781 A | 1/1977 | Knapp | |
| 4,008,763 A | 2/1977 | Lowe, Jr. | |
| 4,015,995 A | 4/1977 | Hess | |
| 4,018,285 A | 4/1977 | Watkins et al. | |
| 4,029,148 A | 6/1977 | Emery | |
| 4,031,958 A | 6/1977 | Sandiford et al. | |
| 4,042,032 A | 8/1977 | Anderson et al. | |
| 4,052,343 A | 10/1977 | Cunningham | |
| 4,052,345 A | 10/1977 | Austin et al. | |
| 4,060,988 A | 12/1977 | Arnold | |
| 4,068,718 A | 1/1978 | Cooke, Jr. et al. | |
| 4,070,865 A | 1/1978 | McLaughlin | |
| 4,074,760 A | 2/1978 | Copeland et al. | |
| 4,085,801 A | 4/1978 | Sifferman et al. | |
| 4,085,802 A | 4/1978 | Sifferman et al. | |
| 4,089,437 A | 5/1978 | Chutter et al. | |
| 4,091,868 A | 5/1978 | Kozlowski et al. | 166/250 |
| 4,127,173 A | 11/1978 | Watkins et al. | |
| 4,129,183 A | 12/1978 | Kalfoglou | |
| 4,129,534 A | 12/1978 | Cunningham | |
| 4,142,595 A | 3/1979 | Anderson et al. | |
| 4,152,274 A | 5/1979 | Phillips et al. | |
| 4,158,521 A | 6/1979 | Anderson et al. | |
| 4,158,726 A | 6/1979 | Kamada et al. | |
| 4,228,277 A | 10/1980 | Landoll | |
| 4,245,702 A | 1/1981 | Haafkens et al. | |
| 4,247,430 A | 1/1981 | Constien | |
| 4,259,205 A | 3/1981 | Murphey | |
| 4,273,187 A | 6/1981 | Satter et al. | |
| 4,291,766 A | 9/1981 | Davies et al. | |
| 4,299,710 A | 11/1981 | Dupre et al. | |
| 4,305,463 A | 12/1981 | Zakiewicz | |
| 4,306,981 A | 12/1981 | Blair, Jr. | |
| 4,336,842 A | 6/1982 | Graham et al. | |
| 4,337,828 A | 7/1982 | Blair, Jr. | |
| 4,352,674 A | 10/1982 | Fery | |
| 4,353,806 A | 10/1982 | Canter et al. | |
| 4,366,071 A | 12/1982 | McLaughlin et al. | |
| 4,366,072 A | 12/1982 | McLaughlin et al. | |
| 4,366,073 A | 12/1982 | McLaughlin et al. | |
| 4,366,074 A | 12/1982 | McLaughlin et al. | |
| 4,374,739 A | 2/1983 | McLaughlin et al. | |
| 4,392,988 A | 7/1983 | Dobson et al. | |
| 4,393,939 A | 7/1983 | Smith et al. | |
| 4,395,340 A | 7/1983 | McLaughlin | |
| 4,399,866 A | 8/1983 | Dearth | |
| 4,401,789 A | 8/1983 | Gideon | |
| 4,415,805 A | 11/1983 | Fertl et al. | |
| 4,428,427 A | 1/1984 | Friedman | |
| 4,439,334 A | 3/1984 | Borchardt | |
| 4,439,489 A | 3/1984 | Johnson et al. | |
| 4,440,649 A | 4/1984 | Loftin et al. | |
| 4,441,556 A | 4/1984 | Powers et al. | |
| 4,443,347 A | 4/1984 | Underdown et al. | |
| 4,447,342 A | 5/1984 | Borchardt et al. | |
| 4,460,052 A | 7/1984 | Gockel et al. | |
| 4,460,627 A | 7/1984 | Weaver et al. | |
| 4,462,718 A | 7/1984 | McLaughlin et al. | |
| 4,466,831 A | 8/1984 | Murphey | |
| 4,493,875 A | 1/1985 | Beck et al. | |
| 4,494,605 A | 1/1985 | Wiechel et al. | |
| 4,498,995 A | 2/1985 | Gockel | |
| 4,499,214 A | 2/1985 | Sortwell | |
| 4,501,328 A | 2/1985 | Nichols | |
| 4,527,627 A | 7/1985 | Graham et al. | |
| 4,532,052 A | 7/1985 | Weaver et al. | |
| 4,536,297 A | 8/1985 | Loftin et al. | |
| 4,536,303 A | 8/1985 | Borchardt | |
| 4,536,305 A | 8/1985 | Borchardt et al. | |
| 4,541,489 A | 9/1985 | Wu | |
| 4,546,012 A | 10/1985 | Brooks | |
| 4,552,670 A | 11/1985 | Lipowski et al. | |
| 4,553,596 A | 11/1985 | Graham et al. | |
| 4,554,081 A | 11/1985 | Borchardt et al. | |
| 4,563,292 A | 1/1986 | Borchardt | |
| 4,564,459 A | 1/1986 | Underdown et al. | |
| 4,572,803 A | 2/1986 | Yamazoe et al. | |
| 4,585,064 A | 4/1986 | Graham et al. | |
| 4,604,216 A | 8/1986 | Irvin et al. | |
| 4,608,139 A | 8/1986 | Craun et al. | |
| 4,619,776 A | 10/1986 | Mondshine | |
| 4,627,926 A | 12/1986 | Peiffer et al. | |
| 4,649,998 A | 3/1987 | Friedman | |
| 4,662,448 A | 5/1987 | Ashford et al. | |
| 4,664,819 A | 5/1987 | Glaze et al. | |
| 4,665,988 A | 5/1987 | Murphey et al. | |

| | | | | | | |
|---|---|---|---|---|---|---|
| 4,669,543 A | 6/1987 | Young | | 5,218,038 A | 6/1993 | Johnson et al. |
| 4,670,501 A | 6/1987 | Dymond | | 5,232,955 A | 8/1993 | Csabai et al. |
| 4,671,883 A | 6/1987 | Connell | | 5,232,961 A | 8/1993 | Murphey et al. |
| 4,675,140 A | 6/1987 | Sparks et al. | | 5,238,068 A | 8/1993 | Fredrickson et al. |
| 4,681,165 A | 7/1987 | Bannister | | 5,244,042 A | 9/1993 | Dovan et al. |
| 4,683,954 A | 8/1987 | Walker et al. | | 5,244,362 A | 9/1993 | Conally et al. |
| 4,693,639 A | 9/1987 | Hollenbeak et al. | | 5,248,665 A | 9/1993 | Hale et al. |
| 4,694,905 A | 9/1987 | Armbruster | | 5,249,627 A | 10/1993 | Harms |
| 4,699,722 A | 10/1987 | Dymond et al. | | 5,249,628 A | 10/1993 | Surjaatmadia |
| 4,702,319 A | 10/1987 | Bock et al. | | 5,256,651 A | 10/1993 | Phelps et al. |
| 4,718,491 A | 1/1988 | Kholer et al. ............... 166/294 | | 5,256,729 A | 10/1993 | Kutta et al. |
| 4,730,028 A | 3/1988 | Bock et al. | | 5,265,678 A | 11/1993 | Grundmann |
| 4,733,729 A | 3/1988 | Copeland | | 5,271,466 A | 12/1993 | Harms |
| 4,739,832 A | 4/1988 | Jennings, Jr. et al. | | 5,273,115 A | 12/1993 | Spafford |
| 4,772,646 A | 9/1988 | Harms et al. | | 5,278,203 A | 1/1994 | Harms |
| 4,777,200 A | 10/1988 | Dymond et al. | | 5,285,849 A | 2/1994 | Surles et al. |
| 4,785,884 A | 11/1988 | Armbruster | | 5,293,939 A | 3/1994 | Surles et al. |
| 4,787,453 A | 11/1988 | Hewgill et al. | | 5,295,542 A | 3/1994 | Cole et al. |
| 4,789,105 A | 12/1988 | Hosokawa et al. | | 5,320,171 A | 6/1994 | Laramay |
| 4,796,701 A | 1/1989 | Hudson et al. | | 5,321,062 A | 6/1994 | Landrum et al. |
| 4,797,262 A | 1/1989 | Dewitz | | 5,325,923 A | 7/1994 | Surjaatmadja et al. |
| 4,800,960 A | 1/1989 | Friedman et al. | | 5,330,005 A | 7/1994 | Card et al. |
| 4,814,096 A | 3/1989 | Evani | | 5,332,037 A | 7/1994 | Schmidt et al. |
| 4,828,725 A | 5/1989 | Lai et al. | | 5,335,726 A | 8/1994 | Rodrigues |
| 4,828,726 A | 5/1989 | Himes et al. | | 5,342,530 A | 8/1994 | Aften et al. |
| 4,829,100 A | 5/1989 | Murphey et al. | | 5,351,754 A | 10/1994 | Hardin et al. |
| 4,838,352 A | 6/1989 | Oberste-Padtberg et al. | | 5,358,051 A | 10/1994 | Rodrigues |
| 4,842,070 A | 6/1989 | Sharp | | 5,360,068 A | 11/1994 | Sprunt et al. |
| 4,842,072 A | 6/1989 | Friedman et al. | | 5,361,856 A | 11/1994 | Surjaatmadja et al. |
| 4,846,118 A | 7/1989 | Slattery et al. | | 5,377,756 A | 1/1995 | Northrop et al. |
| 4,848,470 A | 7/1989 | Korpics | | 5,377,759 A | 1/1995 | Surles |
| 4,850,430 A | 7/1989 | Copeland et al. | | 5,379,841 A | 1/1995 | Pusch et al. |
| 4,856,590 A | 8/1989 | Caillier | | 5,381,864 A | 1/1995 | Nguyen et al. |
| 4,870,167 A | 9/1989 | Zody et al. | | 5,382,371 A | 1/1995 | Stahl et al. |
| 4,875,525 A | 10/1989 | Mana | | 5,388,648 A | 2/1995 | Jordan, Jr. |
| 4,886,354 A | 12/1989 | Welch et al. | | 5,390,741 A | 2/1995 | Payton et al. |
| 4,888,240 A | 12/1989 | Graham et al. | | 5,393,810 A | 2/1995 | Harris et al. |
| 4,892,147 A | 1/1990 | Jennings, Jr. et al. | | 5,396,957 A | 3/1995 | Surjaatmadja et al. |
| 4,895,207 A | 1/1990 | Friedman et al. | | 5,402,846 A | 4/1995 | Jennings, Jr. et al. |
| 4,898,750 A | 2/1990 | Friedman et al. | | 5,403,822 A | 4/1995 | Mueller et al. |
| 4,903,770 A | 2/1990 | Friedman et al. | | 5,420,174 A | 5/1995 | Dewprashad |
| 4,921,576 A | 5/1990 | Hurd | | 5,422,183 A | 6/1995 | Sinclair et al. |
| 4,928,763 A * | 5/1990 | Falk ............... 166/285 | | 5,423,381 A | 6/1995 | Surles et al. |
| 4,934,456 A | 6/1990 | Moradi-Araghi | | 5,424,284 A | 6/1995 | Patel et al. |
| 4,936,385 A | 6/1990 | Weaver et al. | | 5,445,223 A | 8/1995 | Nelson et al. |
| 4,941,537 A | 7/1990 | Langemeier et al. | | 5,464,060 A | 11/1995 | Hale et al. |
| 4,942,186 A | 7/1990 | Murphey et al. | | 5,473,059 A | 12/1995 | Yeh |
| 4,956,104 A | 9/1990 | Cowan et al. | | 5,492,177 A | 2/1996 | Yeh et al. |
| 4,959,432 A | 9/1990 | Fan et al. | | 5,492,178 A | 2/1996 | Nguyen et al. |
| 4,960,876 A | 10/1990 | Molteni et al. | | 5,494,103 A | 2/1996 | Surjaatmadja et al. |
| 4,969,522 A | 11/1990 | Whitehurst et al. | | 5,494,178 A | 2/1996 | Maharg |
| 4,969,523 A | 11/1990 | Martin et al. | | 5,498,280 A | 3/1996 | Fistner et al. |
| 4,984,635 A | 1/1991 | Cullick et al. | | 5,499,678 A | 3/1996 | Surjaatmadja |
| 5,002,127 A * | 3/1991 | Dalrymple et al. ............ 166/295 | | 5,501,274 A | 3/1996 | Nguyen |
| 5,030,603 A | 7/1991 | Rumpf et al. | | 5,501,275 A | 3/1996 | Card et al. |
| 5,049,743 A | 9/1991 | Taylor, III et al. | | 5,512,071 A | 4/1996 | Yam et al. |
| 5,051,197 A | 9/1991 | Kalfayan et al. | | 5,520,250 A | 5/1996 | Harry et al. |
| 5,056,597 A | 10/1991 | Stowe, III et al. | | 5,522,460 A | 6/1996 | Shu |
| 5,067,564 A * | 11/1991 | Sydansk ............. 166/270 | | 5,529,123 A | 6/1996 | Carpenter et al. |
| 5,071,934 A | 12/1991 | Peiffer | | 5,531,274 A | 7/1996 | Bienvenu, Jr. |
| 5,082,056 A | 1/1992 | Tackett, Jr. et al. | | 5,545,824 A | 8/1996 | Stengel et al. |
| 5,095,987 A | 3/1992 | Weaver et al. | | 5,547,023 A | 8/1996 | McDaniel et al. |
| 5,097,904 A | 3/1992 | Himes | | 5,551,513 A | 9/1996 | Surles et al. |
| 5,105,886 A | 4/1992 | Strubhar et al. | | 5,551,514 A | 9/1996 | Nelson et al. |
| 5,107,928 A | 4/1992 | Hilterhaus | | 5,582,249 A | 12/1996 | Caveny |
| 5,128,390 A | 7/1992 | Murphey et al. | | 5,582,250 A | 12/1996 | Constien |
| 5,135,051 A | 8/1992 | Facteau et al. | | 5,588,488 A | 12/1996 | Vijn et al. |
| 5,146,986 A | 9/1992 | Dalrymple | | 5,595,245 A | 1/1997 | Scott, III |
| 5,150,754 A | 9/1992 | Phelps et al. ............... 166/294 | | 5,597,783 A | 1/1997 | Audibert et al. |
| 5,160,642 A | 11/1992 | Schield et al. | | 5,597,784 A | 1/1997 | Sinclair et al. |
| 5,165,438 A | 11/1992 | Facteau et al. | | 5,604,184 A | 2/1997 | Ellis et al. |
| 5,173,527 A | 12/1992 | Calve et al. | | 5,607,902 A | 3/1997 | Smith et al. |
| 5,178,218 A | 1/1993 | Dees | | 5,620,049 A | 4/1997 | Gipson et al. |
| 5,182,051 A | 1/1993 | Bandy et al. | | 5,637,556 A | 6/1997 | Argillier et al. |
| 5,197,544 A | 3/1993 | Himes | | 5,639,806 A | 6/1997 | Johnson et al. |
| 5,199,491 A | 4/1993 | Kutta et al. | | 5,643,460 A | 7/1997 | Marble et al. |
| 5,199,492 A | 4/1993 | Surles et al. | | 5,646,093 A | 7/1997 | Dino |
| 5,208,216 A | 5/1993 | Williamson et al. | | 5,663,123 A | 9/1997 | Goodhue, Jr. et al. |
| 5,211,234 A | 5/1993 | Floyd | | 5,669,456 A | 9/1997 | Audibert et al. |

| Patent No. | Date | Name |
|---|---|---|
| 5,681,796 A | 10/1997 | Nimerick |
| 5,692,566 A | 12/1997 | Surles |
| 5,697,440 A | 12/1997 | Weaver |
| 5,697,441 A * | 12/1997 | Vercaemer et al. ........... 166/285 |
| 5,697,448 A | 12/1997 | Johnson |
| 5,701,956 A | 12/1997 | Hardy et al. |
| 5,704,426 A | 1/1998 | Rytlewski et al. |
| 5,712,314 A | 1/1998 | Surles et al. |
| 5,720,347 A | 2/1998 | Audibert et al. |
| 5,728,653 A | 3/1998 | Audibert et al. |
| 5,732,364 A | 3/1998 | Kalb et al. |
| 5,735,349 A | 4/1998 | Dawson et al. |
| 5,738,136 A | 4/1998 | Rosenberg |
| 5,765,642 A | 6/1998 | Surjaatmadja |
| 5,775,425 A | 7/1998 | Weaver |
| 5,782,300 A | 7/1998 | James et al. |
| 5,783,822 A | 7/1998 | Buchanan et al. |
| 5,787,986 A | 8/1998 | Weaver |
| 5,791,415 A | 8/1998 | Nguyen |
| 5,799,734 A | 9/1998 | Norman et al. |
| 5,806,593 A | 9/1998 | Surles |
| 5,830,987 A | 11/1998 | Smith |
| 5,833,000 A | 11/1998 | Weaver |
| 5,833,361 A | 11/1998 | Funk |
| 5,836,391 A | 11/1998 | Jonasson et al. |
| 5,836,392 A | 11/1998 | Urlwin-Smith |
| 5,836,393 A | 11/1998 | Johnson |
| 5,837,656 A | 11/1998 | Sinclair et al. |
| 5,837,785 A | 11/1998 | Kinsho et al. |
| 5,839,510 A | 11/1998 | Weaver |
| 5,840,784 A | 11/1998 | Funkhouser et al. |
| 5,849,590 A | 12/1998 | Anderson, II et al. |
| 5,853,048 A | 12/1998 | Weaver |
| 5,864,003 A | 1/1999 | Qureshi et al. |
| 5,865,936 A | 2/1999 | Edelman et al. |
| 5,871,049 A | 2/1999 | Weaver et al. |
| 5,873,413 A | 2/1999 | Chatterji et al. |
| 5,875,844 A | 3/1999 | Chatterji et al. |
| 5,875,845 A | 3/1999 | Chatterji et al. |
| 5,875,846 A | 3/1999 | Chatterji et al. |
| 5,887,653 A | 3/1999 | Bishop et al. |
| 5,893,383 A | 4/1999 | Facteau |
| 5,893,416 A | 4/1999 | Read |
| 5,901,789 A | 5/1999 | Donnelly et al. |
| 5,908,814 A | 6/1999 | Patel et al. |
| 5,911,282 A | 6/1999 | Onan et al. |
| 5,916,933 A | 6/1999 | Johnson et al. |
| 5,921,317 A | 7/1999 | Dewprashad et al. |
| 5,924,488 A | 7/1999 | Nguyen et al. |
| 5,929,437 A | 7/1999 | Elliott et al. |
| 5,934,376 A | 8/1999 | Nguyen |
| 5,944,105 A | 8/1999 | Nguyen |
| 5,944,106 A | 8/1999 | Dalrymple et al. |
| 5,945,387 A | 8/1999 | Chatterji et al. |
| 5,948,734 A | 9/1999 | Sinclair et al. |
| 5,957,204 A | 9/1999 | Chatterji et al. |
| 5,960,784 A | 10/1999 | Ryan |
| 5,960,877 A | 10/1999 | Funkhouser et al. |
| 5,960,878 A | 10/1999 | Nguyen et al. |
| 5,960,880 A | 10/1999 | Nguyen et al. |
| 5,964,291 A | 10/1999 | Bourne et al. |
| 5,969,006 A | 10/1999 | Onan et al. |
| 5,969,823 A | 10/1999 | Wurz et al. |
| 5,972,848 A | 10/1999 | Audibert et al. |
| 5,977,283 A | 11/1999 | Rossitto |
| 5,979,557 A | 11/1999 | Card et al. |
| 5,990,052 A | 11/1999 | Harris |
| 5,994,785 A | 11/1999 | Higuchi et al. |
| RE36,466 E | 12/1999 | Nelson et al. |
| 6,003,600 A | 12/1999 | Nguyen |
| 6,004,400 A | 12/1999 | Bishop et al. |
| 6,006,835 A | 12/1999 | Onan et al. |
| 6,006,836 A | 12/1999 | Chatterji et al. |
| 6,012,524 A | 1/2000 | Chatterji et al. |
| 6,016,870 A | 1/2000 | Dewprashad |
| 6,020,289 A | 2/2000 | Dymond |
| 6,024,170 A | 2/2000 | McCabe et al. |
| 6,028,113 A | 2/2000 | Scepanski |
| 6,028,534 A | 2/2000 | Ciglenec et al. |
| 6,040,398 A | 3/2000 | Kinsho et al. |
| 6,047,772 A | 4/2000 | Weaver |
| 6,059,034 A | 5/2000 | Rickards et al. |
| 6,059,035 A | 5/2000 | Chatterji et al. |
| 6,059,036 A | 5/2000 | Chatterji et al. |
| 6,063,738 A | 5/2000 | Chatterji et al. |
| 6,068,055 A | 5/2000 | Chatterji et al. |
| 6,069,117 A | 5/2000 | Onan et al. |
| 6,070,664 A | 6/2000 | Dalrymple et al. |
| 6,070,667 A | 6/2000 | Gano |
| 6,074,739 A | 6/2000 | Katagiri |
| 6,079,492 A | 6/2000 | Hoogteijling et al. |
| 6,098,711 A | 8/2000 | Chatterji et al. |
| 6,109,350 A | 8/2000 | Nguyen |
| 6,114,410 A | 9/2000 | Betzold |
| 6,116,342 A | 9/2000 | Clark |
| 6,123,871 A | 9/2000 | Carroll |
| 6,124,245 A | 9/2000 | Patel |
| 6,124,246 A | 9/2000 | Heathman et al. |
| 6,130,286 A | 10/2000 | Thomas et al. |
| 6,131,661 A | 10/2000 | Conner et al. |
| 6,140,446 A | 10/2000 | Fujiki et al. |
| 6,143,698 A | 11/2000 | Murphey et al. |
| 6,148,911 A | 11/2000 | Gipson et al. |
| 6,152,234 A | 11/2000 | Newhouse et al. |
| 6,162,766 A | 12/2000 | Muir et al. |
| 6,165,947 A | 12/2000 | Chang et al. |
| 6,169,058 B1 | 1/2001 | Le et al. |
| 6,172,011 B1 | 1/2001 | Card et al. |
| 6,172,077 B1 | 1/2001 | Curtis et al. |
| 6,176,315 B1 | 1/2001 | Reddy et al. |
| 6,177,484 B1 | 1/2001 | Surles |
| 6,184,311 B1 | 2/2001 | O'Keeffe et al. |
| 6,186,228 B1 | 2/2001 | Wegener et al. |
| 6,187,834 B1 | 2/2001 | Thayer et al. |
| 6,187,839 B1 | 2/2001 | Eoff et al. |
| 6,189,615 B1 | 2/2001 | Sydansk |
| 6,192,985 B1 | 2/2001 | Hinkel et al. |
| 6,192,986 B1 | 2/2001 | Urlwin-Smith |
| 6,194,356 B1 | 2/2001 | Jones et al. |
| 6,196,317 B1 | 3/2001 | Hardy |
| 6,202,751 B1 | 3/2001 | Chatterji et al. |
| 6,209,643 B1 | 4/2001 | Nguyen et al. |
| 6,209,644 B1 | 4/2001 | Brunet |
| 6,209,646 B1 | 4/2001 | Reddy et al. |
| 6,210,471 B1 | 4/2001 | Craig |
| 6,213,209 B1 | 4/2001 | Nguyen |
| 6,214,773 B1 | 4/2001 | Harris et al. |
| 6,228,812 B1 | 5/2001 | Dawson et al. |
| 6,231,664 B1 | 5/2001 | Chatterji et al. |
| 6,234,251 B1 | 5/2001 | Chatterji et al. |
| 6,237,687 B1 | 5/2001 | Barbee, Jr. et al. |
| 6,238,597 B1 | 5/2001 | Yim et al. |
| 6,241,019 B1 | 6/2001 | Davidson et al. |
| 6,242,390 B1 | 6/2001 | Mitchell et al. |
| 6,244,344 B1 | 6/2001 | Chatterji et al. |
| 6,253,851 B1 | 7/2001 | Schroeder, Jr. et al. |
| 6,257,335 B1 | 7/2001 | Nguyen et al. |
| 6,260,622 B1 | 7/2001 | Blok et al. |
| 6,271,181 B1 | 8/2001 | Chatterji et al. |
| 6,274,650 B1 | 8/2001 | Cui |
| 6,277,900 B1 | 8/2001 | Oswald et al. |
| 6,279,652 B1 | 8/2001 | Chatterji et al. |
| 6,279,656 B1 | 8/2001 | Sinclair et al. |
| 6,281,172 B1 | 8/2001 | Warren et al. |
| 6,283,210 B1 | 9/2001 | Soliman et al. |
| 6,283,214 B1 | 9/2001 | Guinot et al. |
| 6,291,404 B2 | 9/2001 | House |
| 6,302,207 B1 | 10/2001 | Nguyen |
| 6,306,998 B1 | 10/2001 | Kimura et al. |
| 6,310,008 B1 | 10/2001 | Rietjens |
| 6,311,773 B1 | 11/2001 | Todd et al. |
| 6,315,040 B1 | 11/2001 | Donnelly |
| 6,321,841 B1 | 11/2001 | Eoff et al. |
| 6,328,105 B1 | 12/2001 | Betzold |
| 6,328,106 B1 | 12/2001 | Griffith et al. |
| 6,330,916 B1 | 12/2001 | Rickards et al. |
| 6,330,917 B2 | 12/2001 | Chatterji et al. |
| 6,342,467 B1 | 1/2002 | Chang et al. |

| Patent | Date | Inventor |
|---|---|---|
| 6,350,309 B2 | 2/2002 | Chatterji et al. |
| 6,357,527 B1 | 3/2002 | Norman et al. |
| 6,358,889 B2 | 3/2002 | Waggenspack et al. |
| 6,359,047 B1 | 3/2002 | Thieu et al. |
| 6,364,016 B1 | 4/2002 | Dalrymple |
| 6,364,018 B1 | 4/2002 | Brannon et al. |
| 6,364,945 B1 | 4/2002 | Chatterji et al. |
| 6,367,165 B1 | 4/2002 | Huttlin |
| 6,367,549 B1 | 4/2002 | Chatterji et al. |
| 6,372,678 B1 | 4/2002 | Youngman et al. |
| 6,376,571 B1 | 4/2002 | Chawla et al. |
| 6,380,137 B1 | 4/2002 | Heier et al. |
| 6,394,181 B2 | 5/2002 | Schnatzmeyer et al. |
| 6,401,817 B1 | 6/2002 | Griffith et al. |
| 6,405,796 B1 | 6/2002 | Meyer et al. |
| 6,405,797 B2 | 6/2002 | Davidson et al. |
| 6,406,789 B1 | 6/2002 | McDaniel et al. |
| 6,408,943 B1 | 6/2002 | Schultz et al. |
| 6,415,509 B1 | 7/2002 | Echols et al. |
| 6,422,183 B1 | 7/2002 | Kato |
| 6,422,314 B1 | 7/2002 | Todd et al. |
| 6,439,309 B1 | 8/2002 | Matherly et al. |
| 6,439,310 B1 | 8/2002 | Scott, III et al. |
| 6,440,255 B1 | 8/2002 | Kohlhammer et al. |
| 6,446,722 B2 | 9/2002 | Nguyen |
| 6,448,206 B1 | 9/2002 | Griffith et al. |
| 6,450,260 B1 | 9/2002 | James et al. |
| 6,457,518 B1 | 10/2002 | Castano-Mears et al. |
| 6,458,885 B1 | 10/2002 | Stengel et al. |
| 6,476,169 B1 | 11/2002 | Eoff |
| 6,476,283 B1 | 11/2002 | Devore et al. |
| 6,478,092 B2 | 11/2002 | Voll et al. |
| 6,488,091 B1 | 12/2002 | Weaver et al. |
| 6,488,763 B2 | 12/2002 | Brothers et al. |
| 6,494,263 B2 | 12/2002 | Todd |
| 6,497,283 B1 | 12/2002 | Eoff et al. |
| 6,503,870 B2 | 1/2003 | Griffith et al. |
| 6,510,896 B2 | 1/2003 | Bode et al. |
| 6,516,885 B1 | 2/2003 | Munday |
| 6,520,255 B2 | 2/2003 | Tolman et al. |
| 6,528,157 B1 | 3/2003 | Hussain et al. |
| 6,531,427 B1 | 3/2003 | Shuchart et al. |
| 6,534,449 B1 | 3/2003 | Gilmour et al. |
| 6,536,939 B1 | 3/2003 | Blue |
| 6,538,576 B1 | 3/2003 | Schultz et al. |
| 6,543,545 B1 | 4/2003 | Chatterji et al. |
| 6,550,959 B2 | 4/2003 | Huber et al. |
| 6,552,333 B1 | 4/2003 | Storm et al. |
| 6,555,507 B2 | 4/2003 | Chatterji et al. |
| 6,562,762 B2 | 5/2003 | Cowan et al. |
| 6,569,983 B1 | 5/2003 | Treybig et al. |
| 6,582,819 B2 | 6/2003 | McDaniel et al. |
| 6,588,926 B2 | 7/2003 | Huber et al. |
| 6,588,928 B2 | 7/2003 | Huber et al. |
| 6,593,402 B2 | 7/2003 | Chatterji et al. |
| 6,599,863 B1 | 7/2003 | Palmer et al. |
| 6,601,648 B2 | 8/2003 | Ebinger |
| 6,607,035 B1 | 8/2003 | Reddy et al. |
| 6,608,162 B1 | 8/2003 | Chiu et al. |
| 6,609,578 B2 | 8/2003 | Patel et al. |
| 6,616,320 B2 | 9/2003 | Huber et al. |
| 6,620,857 B2 | 9/2003 | Valet |
| 6,626,241 B2 | 9/2003 | Nguyen |
| 6,627,719 B2 | 9/2003 | Whipple et al. |
| 6,632,778 B1 | 10/2003 | Ayoub et al. |
| 6,632,892 B2 | 10/2003 | Rubinsztajn et al. |
| 6,637,517 B2 | 10/2003 | Samuel et al. |
| 6,642,309 B2 | 11/2003 | Komitsu et al. |
| 6,648,501 B2 | 11/2003 | Huber et al. |
| 6,656,885 B2 | 12/2003 | House et al. |
| 6,659,179 B2 | 12/2003 | Nguyen |
| 6,662,874 B2 | 12/2003 | Surjaatmadja et al. |
| 6,664,343 B2 | 12/2003 | Narisawa et al. |
| 6,668,926 B2 | 12/2003 | Nguyen |
| 6,669,771 B2 | 12/2003 | Tokiwa et al. |
| 6,677,426 B2 | 1/2004 | Noro et al. |
| 6,705,400 B1 | 3/2004 | Nguyen et al. |
| 6,710,107 B2 | 3/2004 | Audibert et al. |
| 6,713,170 B1 | 3/2004 | Kaneko et al. |
| 6,725,926 B2 | 4/2004 | Nguyen et al. |
| 6,725,930 B2 | 4/2004 | Boney et al. |
| 6,725,931 B2 | 4/2004 | Nguyen |
| 6,729,404 B2 | 5/2004 | Nguyen |
| 6,729,405 B2 | 5/2004 | DiLullo et al. |
| 6,732,800 B2 | 5/2004 | Acock |
| 6,743,288 B2 | 6/2004 | Eoff et al. |
| 6,745,159 B1 | 6/2004 | Todd et al. |
| 6,749,025 B1 | 6/2004 | Brannon et al. |
| 6,755,245 B2 | 6/2004 | Nguyen |
| 6,764,981 B1 | 7/2004 | Eoff et al. |
| 6,766,858 B2 | 7/2004 | Nguyen et al. |
| 6,767,867 B2 | 7/2004 | Chatterji et al. |
| 6,767,869 B2 | 7/2004 | DiLullo et al. |
| 6,776,235 B1 | 8/2004 | England |
| 6,776,236 B1 | 8/2004 | Nguyen |
| 6,780,822 B2 | 8/2004 | Cowan et al. |
| 6,787,506 B2 | 9/2004 | Blair et al. |
| 6,790,812 B2 | 9/2004 | Halliday et al. |
| 6,803,348 B2 | 10/2004 | Jones et al. |
| 6,832,650 B2 | 12/2004 | Nguyen et al. |
| 6,832,655 B2 | 12/2004 | Ravensbergen et al. |
| 6,837,309 B2 | 1/2005 | Boney et al. |
| 6,838,417 B2 | 1/2005 | Bouwmeester |
| 6,843,841 B2 | 1/2005 | Reddy |
| 6,846,420 B2 | 1/2005 | Reddy et al. |
| 6,851,474 B2 | 2/2005 | Nguyen |
| 6,855,672 B2 | 2/2005 | Poelker et al. |
| 6,866,099 B2 | 3/2005 | Nguyen |
| 6,881,709 B2 | 4/2005 | Nelson et al. |
| 6,884,760 B1 | 4/2005 | Brand et al. |
| 6,887,834 B2 | 5/2005 | Nguyen |
| 6,892,813 B2 | 5/2005 | Nguyen |
| 6,913,081 B2 | 7/2005 | Powell et al. |
| 6,920,928 B1 | 7/2005 | Davies et al. ................ 166/279 |
| 6,932,157 B2 | 8/2005 | Mcgregor |
| 6,935,432 B2 | 8/2005 | Nguyen |
| 6,951,250 B2 | 10/2005 | Reddy |
| 6,962,200 B2 | 11/2005 | Nguyen |
| 6,962,203 B2 | 11/2005 | Funchess |
| 6,978,836 B2 | 12/2005 | Nguyen |
| 6,981,552 B2 | 1/2006 | Reddy et al. |
| 6,997,259 B2 | 2/2006 | Nguyen |
| 7,007,752 B2 | 3/2006 | Reddy et al. |
| 7,008,908 B2 | 3/2006 | Chan et al. |
| 7,013,976 B2 | 3/2006 | Nguyen et al. |
| 7,017,665 B2 | 3/2006 | Nguyen |
| 7,025,134 B2 | 4/2006 | Byrd et al. |
| 7,028,774 B2 | 4/2006 | Nguyen |
| 7,032,667 B2 | 4/2006 | Nguyen et al. |
| 7,036,587 B2 | 5/2006 | Munoz, Jr. et al. |
| 7,036,589 B2 | 5/2006 | Nguyen |
| 7,040,403 B2 | 5/2006 | Nguyen et al. |
| 7,059,406 B2 | 6/2006 | Nguyen |
| 7,063,150 B2 | 6/2006 | Slabaugh |
| 7,063,151 B2 | 6/2006 | Nguyen |
| 7,066,258 B2 | 6/2006 | Justus et al. |
| 7,073,581 B2 | 7/2006 | Nguyen et al. |
| 7,080,688 B2 | 7/2006 | Todd et al. |
| 7,081,439 B2 | 7/2006 | Sullivan et al. |
| 7,091,159 B2 | 8/2006 | Eoff et al. |
| 7,093,658 B2 | 8/2006 | Chatterji et al. |
| 7,100,691 B2 | 9/2006 | Nguyen |
| 7,104,325 B2 | 9/2006 | Nguyen |
| 7,108,083 B2 | 9/2006 | Simonds |
| 7,114,560 B2 | 10/2006 | Nguyen et al. |
| 7,114,568 B2 | 10/2006 | Eoff |
| 7,114,570 B2 | 10/2006 | Nguyen |
| 7,117,942 B2 | 10/2006 | Dalrymple |
| 7,128,148 B2 | 10/2006 | Eoff |
| 7,131,491 B2 | 11/2006 | Blauch |
| 7,153,575 B2 | 12/2006 | Anderson et al. |
| 7,156,194 B2 | 1/2007 | Nguyen |
| 7,159,656 B2 | 1/2007 | Eoff et al. |
| 7,178,596 B2 | 2/2007 | Blauch et al. |
| 7,182,136 B2 | 2/2007 | Dalrymple et al. |
| 7,204,311 B2 | 4/2007 | Welton et al. |
| 7,207,387 B2 | 4/2007 | Eoff et al. |
| 7,210,528 B1 | 5/2007 | Brannon et al. |

| | | |
|---|---|---|
| 7,216,707 B2 | 5/2007 | Eoff et al. |
| 7,216,711 B2 | 5/2007 | Nguyen et al. |
| 7,220,708 B2 | 5/2007 | Zamora et al. |
| 7,252,146 B2 | 8/2007 | Slabaugh et al. |
| 7,261,156 B2 | 8/2007 | Nguyen et al. |
| 7,264,051 B2 | 9/2007 | Nguyen et al. |
| 7,264,052 B2 | 9/2007 | Nguyen et al. |
| 7,267,717 B2 | 9/2007 | Watanabe et al. |
| 7,273,099 B2 | 9/2007 | East, Jr. et al. |
| 7,281,581 B2 | 10/2007 | Nguyen et al. |
| 7,306,037 B2 | 12/2007 | Nguyen et al. |
| 7,343,973 B2 | 3/2008 | Dusterhoft et al. |
| 7,398,825 B2 | 7/2008 | Nguyen et al. |
| 7,493,957 B2 | 2/2009 | Nguyen et al. |
| 7,563,750 B2 | 7/2009 | Eoff et al. |
| 7,730,950 B2 | 6/2010 | Nguyen et al. |
| 2001/0016562 A1 | 8/2001 | Muir et al. |
| 2002/0036088 A1 | 3/2002 | Todd |
| 2002/0043370 A1 | 4/2002 | Poe |
| 2002/0048676 A1 | 4/2002 | McDaniel et al. |
| 2002/0070020 A1 | 6/2002 | Nguyen |
| 2002/0074166 A1* | 6/2002 | Chavez et al. .................. 175/66 |
| 2002/0104217 A1 | 8/2002 | Echols et al. |
| 2002/0160920 A1 | 10/2002 | Dawson et al. |
| 2002/0169085 A1 | 11/2002 | Miller et al. |
| 2002/0189808 A1 | 12/2002 | Nguyen et al. |
| 2003/0006036 A1 | 1/2003 | Malone et al. |
| 2003/0013871 A1 | 1/2003 | Mallon et al. |
| 2003/0060374 A1 | 3/2003 | Cooke, Jr. |
| 2003/0092578 A1 | 5/2003 | Hirasaki et al. ............... 507/100 |
| 2003/0104948 A1 | 6/2003 | Poelker et al. |
| 2003/0106690 A1 | 6/2003 | Boney et al. |
| 2003/0114314 A1 | 6/2003 | Ballard et al. |
| 2003/0114317 A1 | 6/2003 | Benton et al. |
| 2003/0130133 A1 | 7/2003 | Vollmer |
| 2003/0131999 A1 | 7/2003 | Nguyen et al. |
| 2003/0148893 A1 | 8/2003 | Lunghofer et al. |
| 2003/0176586 A1* | 9/2003 | Jones et al. ................ 525/328.5 |
| 2003/0186820 A1 | 10/2003 | Thesing |
| 2003/0188766 A1 | 10/2003 | Banerjee et al. |
| 2003/0188872 A1 | 10/2003 | Nguyen et al. |
| 2003/0191030 A1 | 10/2003 | Blair et al. |
| 2003/0196805 A1 | 10/2003 | Boney et al. |
| 2003/0205376 A1 | 11/2003 | Ayoub et al. |
| 2003/0230408 A1 | 12/2003 | Acock et al. |
| 2003/0230431 A1 | 12/2003 | Reddy et al. |
| 2003/0234103 A1 | 12/2003 | Lee et al. |
| 2004/0000402 A1 | 1/2004 | Nguyen et al. |
| 2004/0014607 A1 | 1/2004 | Sinclair et al. |
| 2004/0014608 A1 | 1/2004 | Nguyen et al. |
| 2004/0040706 A1 | 3/2004 | Hossaini et al. |
| 2004/0040708 A1 | 3/2004 | Stephenson et al. |
| 2004/0040712 A1 | 3/2004 | Ravi et al. |
| 2004/0040713 A1 | 3/2004 | Nguyen et al. |
| 2004/0043906 A1 | 3/2004 | Heath et al. |
| 2004/0045712 A1 | 3/2004 | Eoff et al. |
| 2004/0048752 A1 | 3/2004 | Nguyen et al. |
| 2004/0055747 A1 | 3/2004 | Lee |
| 2004/0060702 A1 | 4/2004 | Kotlar et al. |
| 2004/0106525 A1 | 6/2004 | Willbert et al. |
| 2004/0138068 A1 | 7/2004 | Rimmer et al. |
| 2004/0144542 A1 | 7/2004 | Chiappa et al. ............ 166/305.1 |
| 2004/0149441 A1 | 8/2004 | Nguyen et al. |
| 2004/0152602 A1 | 8/2004 | Boles |
| 2004/0154799 A1 | 8/2004 | Powell et al. |
| 2004/0171495 A1 | 9/2004 | Zamora et al. |
| 2004/0177961 A1 | 9/2004 | Nguyen |
| 2004/0194960 A1 | 10/2004 | DiLullo et al. |
| 2004/0194961 A1 | 10/2004 | Nguyen et al. |
| 2004/0206499 A1 | 10/2004 | Nguyen et al. |
| 2004/0211559 A1 | 10/2004 | Nguyen et al. |
| 2004/0211561 A1 | 10/2004 | Nguyen et al. |
| 2004/0220058 A1 | 11/2004 | Eoff et al. |
| 2004/0221992 A1 | 11/2004 | Nguyen et al. |
| 2004/0229756 A1 | 11/2004 | Eoff et al. |
| 2004/0229757 A1 | 11/2004 | Eoff et al. |
| 2004/0231845 A1 | 11/2004 | Cooke, Jr. |
| 2004/0231847 A1 | 11/2004 | Nguyen et al. |
| 2004/0256097 A1 | 12/2004 | Byrd et al. |
| 2004/0256099 A1 | 12/2004 | Nguyen et al. |
| 2004/0261993 A1 | 12/2004 | Nguyen |
| 2004/0261995 A1 | 12/2004 | Nguyen et al. |
| 2004/0261997 A1 | 12/2004 | Nguyen et al. |
| 2004/0261999 A1 | 12/2004 | Nguyen |
| 2005/0000694 A1 | 1/2005 | Dalrymple et al. |
| 2005/0000731 A1 | 1/2005 | Nguyen et al. |
| 2005/0006093 A1 | 1/2005 | Nguyen et al. |
| 2005/0006095 A1 | 1/2005 | Justus et al. |
| 2005/0006096 A1 | 1/2005 | Nguyen et al. |
| 2005/0028976 A1 | 2/2005 | Nguyen |
| 2005/0028979 A1 | 2/2005 | Brannon et al. |
| 2005/0034862 A1 | 2/2005 | Nguyen |
| 2005/0034865 A1 | 2/2005 | Todd et al. |
| 2005/0045326 A1 | 3/2005 | Nguyen |
| 2005/0045330 A1 | 3/2005 | Nguyen et al. |
| 2005/0045384 A1 | 3/2005 | Nguyen |
| 2005/0051331 A1 | 3/2005 | Nguyen et al. |
| 2005/0051332 A1 | 3/2005 | Nguyen et al. |
| 2005/0059555 A1 | 3/2005 | Dusterhoft |
| 2005/0061509 A1 | 3/2005 | Nguyen |
| 2005/0092489 A1 | 5/2005 | Welton et al. |
| 2005/0126780 A1 | 6/2005 | Todd et al. |
| 2005/0139359 A1 | 6/2005 | Maurer et al. |
| 2005/0145385 A1 | 7/2005 | Nguyen |
| 2005/0155796 A1 | 7/2005 | Eoff et al. |
| 2005/0164894 A1 | 7/2005 | Eoff et al. |
| 2005/0173116 A1 | 8/2005 | Nguyen et al. |
| 2005/0178551 A1 | 8/2005 | Tolman et al. |
| 2005/0194135 A1 | 9/2005 | Nguyen et al. |
| 2005/0194136 A1 | 9/2005 | Nguyen et al. |
| 2005/0194140 A1 | 9/2005 | Dalrymple |
| 2005/0194142 A1* | 9/2005 | Nguyen et al. ............ 166/280.2 |
| 2005/0197258 A1 | 9/2005 | Nguyen |
| 2005/0199396 A1 | 9/2005 | Sierra et al. |
| 2005/0207001 A1 | 9/2005 | Laufer et al. |
| 2005/0230107 A1 | 10/2005 | McDaniel |
| 2005/0230114 A1 | 10/2005 | Eoff et al. |
| 2005/0230116 A1 | 10/2005 | Eoff et al. |
| 2005/0257929 A1 | 11/2005 | Nguyen et al. |
| 2005/0263283 A1* | 12/2005 | Nguyen ....................... 166/281 |
| 2005/0267001 A1 | 12/2005 | Weaver et al. |
| 2005/0269086 A1 | 12/2005 | Nguyen et al. |
| 2005/0269099 A1* | 12/2005 | Stegent et al. ............. 166/308.1 |
| 2005/0269101 A1 | 12/2005 | Stegent et al. |
| 2005/0274510 A1 | 12/2005 | Nguyen et al. |
| 2005/0274517 A1 | 12/2005 | Blauch et al. |
| 2005/0274520 A1 | 12/2005 | Nguyen et al. |
| 2005/0277554 A1 | 12/2005 | Blauch |
| 2005/0282973 A1 | 12/2005 | Nguyen |
| 2005/0284632 A1 | 12/2005 | Dalrymple et al. |
| 2005/0284637 A1 | 12/2005 | Stegent et al. |
| 2006/0048943 A1* | 3/2006 | Parker et al. ............... 166/308.1 |
| 2006/0048944 A1 | 3/2006 | van Batenburg et al. |
| 2006/0052251 A1 | 3/2006 | Anderson et al. |
| 2006/0089266 A1 | 4/2006 | Dusterhoft et al. |
| 2006/0102344 A1 | 5/2006 | Surjaatmadja |
| 2006/0113078 A1 | 6/2006 | Nguyen et al. |
| 2006/0113080 A1 | 6/2006 | Nguyen |
| 2006/0124303 A1 | 6/2006 | Nguyen et al. |
| 2006/0124309 A1 | 6/2006 | Nguyen |
| 2006/0137875 A1 | 6/2006 | Dusterhoft |
| 2006/0157243 A1 | 7/2006 | Nguyen |
| 2006/0175058 A1 | 8/2006 | Nguyen |
| 2006/0219405 A1 | 10/2006 | Nguyen |
| 2006/0219408 A1 | 10/2006 | Nguyen |
| 2006/0234871 A1 | 10/2006 | Dalrymple et al. |
| 2006/0234874 A1 | 10/2006 | Eoff |
| 2006/0240994 A1 | 10/2006 | Eoff |
| 2006/0240995 A1 | 10/2006 | Rickman |
| 2006/0260810 A1 | 11/2006 | Weaver et al. |
| 2006/0260813 A1 | 11/2006 | Welton et al. |
| 2006/0264332 A1 | 11/2006 | Welton et al. |
| 2006/0266522 A1 | 11/2006 | Eoff |
| 2006/0283592 A1 | 12/2006 | Sierra |
| 2006/0289160 A1 | 12/2006 | van Batenburg et al. |
| 2006/0293446 A1 | 12/2006 | Reddy |
| 2007/0007010 A1 | 1/2007 | Welton et al. |
| 2007/0012445 A1 | 1/2007 | Nguyen |

| | | | |
|---|---|---|---|
| 2007/0029087 | A1 | 2/2007 | Nguyen et al. |
| 2007/0114032 | A1 | 5/2007 | Stegent et al. |
| 2007/0131422 | A1 | 6/2007 | Gatlin et al. |
| 2007/0131425 | A1 | 6/2007 | Gatlin et al. |
| 2007/0267194 | A1 | 11/2007 | Nguyen et al. |
| 2008/0006406 | A1 | 1/2008 | Nguyen et al. |
| 2008/0070805 | A1 | 3/2008 | Munoz et al. |
| 2008/0070807 | A1 | 3/2008 | Munoz et al. |
| 2008/0070808 | A1 | 3/2008 | Munoz et al. |
| 2008/0110624 | A1 | 5/2008 | Nguyen et al. |
| 2008/0139411 | A1 | 6/2008 | Harris et al. |
| 2008/0173448 | A1 | 7/2008 | Nguyen et al. |

FOREIGN PATENT DOCUMENTS

| | | |
|---|---|---|
| DE | 2 250 552 | 4/1974 |
| EP | 0313243 | 4/1989 |
| EP | 0 383 337 A2 | 8/1990 |
| EP | 0506934 | 10/1992 |
| EP | 0528595 | 2/1993 |
| EP | 0643196 | 3/1995 |
| EP | 0834644 | 4/1998 |
| EP | 0853186 | 7/1998 |
| EP | 0864726 | 9/1998 |
| EP | 0 896 122 A2 | 2/1999 |
| EP | 0933498 | 8/1999 |
| EP | 1001133 | 5/2000 |
| EP | 1 033 378 A1 | 9/2000 |
| EP | 1132569 | 9/2001 |
| EP | 1 193 365 A1 | 4/2002 |
| EP | 1 312 753 A1 | 5/2003 |
| EP | 1326003 | 7/2003 |
| EP | 1362978 | 11/2003 |
| EP | 1394355 | 3/2004 |
| EP | 1396606 | 3/2004 |
| EP | 1398460 | 3/2004 |
| EP | 1403466 | 3/2004 |
| EP | 1464789 | 10/2004 |
| EP | 1607572 | 12/2005 |
| GB | 1107584 | 3/1968 |
| GB | 1264180 | 2/1972 |
| GB | 1292718 | 10/1972 |
| GB | 2 221 940 A | 2/1990 |
| GB | 2298440 | 9/1996 |
| GB | 2 335 428 A | 9/1999 |
| GB | 2382143 | 5/2003 |
| WO | WO 93/15164 | 8/1993 |
| WO | WO 99/49183 | 9/1999 |
| WO | WO 99/50530 | 10/1999 |
| WO | WO 00/78890 | 12/2000 |
| WO | WO0181914 | 11/2001 |
| WO | WO 02/097236 | 12/2002 |
| WO | WO 03/056130 | 7/2003 |
| WO | WO2004009956 | 1/2004 |
| WO | WO 2004/022667 | 3/2004 |
| WO | WO2004083600 | 9/2004 |
| WO | WO2004090281 | 10/2004 |
| WO | WO 2004/094781 | 11/2004 |
| WO | WO 2004/101706 | 11/2004 |
| WO | WO2004104368 | 12/2004 |
| WO | WO2005021928 | 3/2005 |
| WO | WO2005080749 | 9/2005 |
| WO | WO2006103385 | 10/2006 |
| WO | WO2006116868 | 11/2006 |
| WO | WO2007010190 | 1/2007 |
| WO | WO2007057637 | 5/2007 |
| WO | WO2007091007 | 8/2007 |
| WO | WO2008087391 | 7/2008 |
| WO | WO2008099154 | 8/2008 |
| WO | WO2008/007110 A1 | 11/2010 |

OTHER PUBLICATIONS

Dwyann Dalrymple, Larry Eoff, and Julio Vasquez, Field Implementation of "Squeeze Matrix-Access Reservoir-Targeting" Water Reduction System, 2006 Society of Petroleum Engineers, #SPE 101977.

Larry Eoff, E. Dwyann Dalrymple, B.R. Reddy, and Don M. Everett, Structure and Process Optimization for the Use of a Polymeric Relative-Permeability Modifier in Conformance Control, Jun. 2003 Society of Petroleum Engineers Journal, pp. 92-98.

Larry Eoff, Dwyann Dalrymple, and Don Everett, Global Field Results of a Polymeric Gel System in Conformance Applications, 2006 Society of Petroleum Engineers, #SPE 101822.

L.S. Eoff, E.D. Dalrymple, D.M. Everett, and J.E. Vasquez, Worldwide Field Applications of a Polymeric Gel System for Conformance Applications, 2006 Society of Petroleum Engineers, #SPE 98119.

CobraMax$^{SM}$ Fracturing Service, 2005 Halliburton Production Optimization, Stimulation Flyer.

SurgiFrac$^{SM}$ Service—Fracture Stimulation Technique for Horizontal Completions in Low-to-Medium-Permeability Reservoirs, 2006 Halliburton Production Optimization, Stimulation Flyer.

SandTrap$^{SM}$ Formation Consolidation Service, 2005 Halliburton Production Optimization, Stimulation Flyer.

Expedite® Service, 2005 Halliburton Production Optimization, Stimulation Flyer.

Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2.

Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2.

Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.

Zhou, Z. J., et al, *Controlling Formation Damage Using Clay Stabilizers: A Review*, Paper 95-71, The Petroleum Society of CIM, 1995, presented at the 46$^{th}$ Annual Technical Meeting of the Petroleum Society of CIM in Banff, Alberta, Canada, May 14-17.

Halliburton, 2001 Press Releases, *Halliburton Technology Uses Revolutionary Polymer System to Control Unwanted Water Production*, 2002 Halliburton, pp. 1-2.

Halliburton, 2001 Press Releases, *First Halliburton H2Zero™ Conformance Solution Job Performed for a Producing Well in Egypt*, 2002 Halliburton, pp. 1-2.

Halliburton, 2001 Press Releases, *Halliburton Performs First H2Zero™ Conformance Solution Job in North America*, 2002 Halliburton, pp. 1-2.

BJ Services Company, *Aquacon, Product Information*, Aug. 1, 2001, pp. 1-2.

BJ Services Company, *Aquatrol I, Product Information*, Dec. 14, 2000, pp. 1-2.

Proett, et al., *Advanced Dual Probe Formation Tester with Transient, Harmonic, and Pulsed Time-Delay Testing Methods Determines Permeability, Skin, and Anisotropy*, SPE 64650, 2000, Society of Petroleum Engineers Inc., presented at the SPE International Oil and Gas Conference and Exhibition in China held in Beijing, China, Nov. 7-10, 2000.

Proett, et al., *Advanced Permeability and Anisotropy Measurements While Testing and Sampling in Real-time Using a Dual Probe Formation Tester*, SPE 62919, 2000, Society of Petroleum Engineers Inc., presented at the 2000 SPE Annual Technical Conference and Exhibition held in Dallas, Texas, Oct. 1-4, 2000.

Bai, et al., *Improved Determination of Stress-Dependent Permeability for Anisotropic Formations*, SPE/ISRM 78188, 2000, Society of Petroleum Engineers Inc., presented at the SPE/ISRM Rock Mechanics Conference held in Irving, Texas, Oct. 20-23, 2002.

Parker, et al., *Laser Drilling: Effects of Beam Application Methods on Improving Rock Removal*, SPE 84353, 2003, Society of Petroleum Engineers Inc., presented at the SPE Annual Technical Conference and Exhibition held in Denver, Colorado, Oct. 5-8, 2003.

Xu, et al., *Modeling of Laser Spallation Drilling of Rocks for Gas— and Oilwell Drilling*, SPE 95746, 2005, Society of Petroleum Engineers Inc., presented at the 2005 SPE Annual Technical Conference and Exhibition held in Dallas, Texas, Oct. 9-12, 2005.

Batarseh, et al., *Well Perforation Using High-Power Lasers*, SPE 84418, 2003, Society of Petroleum Engineers Inc., presented at the SPE Annual Technical Conference and Exhibition held in Denver, Colorado, Oct. 5-8, 2003.
Gahan, et al., *Analysis of Efficient High-Power Fiber Lasers for Well Perforation*, SPE 90661, 2004, Society of Petroleum Engineers Inc., presented at the SPE Annual Technical Conference and Exhibition held in Houston, Texas, Sep. 26-29, 2004.
Gahan, et al., *Effect of Downhole Pressure Conditions on High-Power Laser Perforation*, SPE 97093, 2005, Society of Petroleum Engineers, presented at the 2005 SPE Annual Technical Conference and Exhibition held in Dallas, Texas, Oct. 9-12, 2005.
U.S. Appl. No. 12/080,647, filed Apr. 4, 2008.
U.S. Appl. No. 12/080,647, filed Apr. 4, 2008, Dalrymple et al.
"Santrol Bioballs"; http://www.fairmounminerals.com/.sub.--SANTROL/SANTROL%20Web%20Site/B.sub- .--TD.htm, Sep. 30, 2004.
CDX Gas, "What is Coalbed Methane?" CDX, LLC. Available @ www.cdxgas.com/what.html, printed p. 1, undated, filed Feb. 16, 2005.
CDX Gas, CDX Solution, 2003, CDX, LLC, Available @ www.cdxgas.com/solution.html, printed pp. 1-2, Feb. 16, 2005.
Dusseault, et al., "Pressure Pulse Workovers in Heavy Oil," SPE 79033, Nov. 2002.
Feisenthal, et al., "Pressure Pulsing—An Improved Method of Waterflooding Fractured Reservoirs," SPE 1788, 1967.
Gidley et al., "Recent Advances in Hydraulic Fracturing," Chapter 6, pp. 109-130, 1989.
Gorman, "Plastic Electric: Lining up the Future of Conducting Polymers," Science News, vol. 163, pp. 312-313, May 17, 2003.
Halliburton brochure entitled "H2Zero Service: Introducing The Next Generation of Cost-Effective Conformance Control Solutions," 2002.
Halliburton brochure entitled "CobraFrac Service, Cost-Effective Method for Stimulation Untapped Reserves—Proved in More Than 30,000 Fracture Treatments", 2004.
Halliburton brochure entitled "CobraJetFrac Service, Cost-Effective Technology That Can Help Reduce Cost per BOE Produced, Shorten Cycle Time and Reduce Capex", Sep. 2006.
Halliburton brochure entitled "SurgiFrac Service, a Quick and Cost-Effective Method to Help Boost Production From Openhole Horizontal Completions,"2002.
Halliburton brochure entitled "Sanfix A Resin", 1999.
Halliburton brochure entitled "INJECTROL A Component", 1999.
Halliburton brochure entitled "INJECTROL U Sealant", 1999.
Halliburton brochure entitled "INJECTROL G Sealant", 1999.
Halliburton brochure entitled "INJECTROL IT Sealant", 1999.
Halliburton brochure entitled "INJECTROL Service Treatment", 1999.
Halliburton brochure entitled "Pillar Frac Stimulation Technique," Fracturing Service Technical Data Sheet.
Halliburton Cobra Frac Advertisement, 2001.
Halliburton Technical Flier—"Multi Stage Frac Completion Methods".
Halliburton brochure entitled "CoalStim Service, Helps Boost Cash Flow From CBM Assets", 2003.
Halliburton brochure entitled "Conductivity Endurance Technology for High Permeability Reservoirs, Helps Prevent Intrusion of Formation Material Into the Proppant Pack for Improved Long-term Production", 2003.
Halliburton brochure entitled "Expedite Service, A Step-Change Improvement Over Conventional Proppant Flowback Control Systems. Provides Up to Three Times the Conductivity of RCPs", 2004.
Halliburton brochure entitled "SandWedge NT Conductivity Enhancement System, Enahances Proppant Pack Conductivity and Helps Prevent Intrusion of Formation Material for Improved Long-Term Production", 2004.
Kazakov, et al., "Optimizing and Managing Coiled Tubing Frac Strings,", SPE 60747, Apr. 2000.
Nguyen, et al., "A Novel Approach for Enhancing Proppant Consolidation: Laboratory Testing and Field Applications," SPE 77748, Oct. 2002.
Nguyen, et al., "New Guidelines for Applying Curable Resin-Coated Proppants," SPE 39582, 1997.
Owens, et al., "Waterflood Pressure Pulsing for Fractured Reservoirs," SPE 1123, Jun. 1966.
Peng, et al., "Pressure Pulsing Waterflooding in Dual Porosity Naturally Fractured Reservoirs," SPE 17587, Nov. 1988.
Raza, "Water and Gas Cyclic Pulsing Method for Improved Oil Recovery," SPE 3005, Dec. 1971.
Almond, et al., "Factors Affecting Proppant Flowback With Resin Coated Proppants," SPE 30096, May 1995.
Wagner, et al., Field Application of Lignosulfonate Gels to Reduce Channeling, South Swan Hills Miscible Unit, Alberta, Canada,: SPE 15547, Oct. 1986.
Paccaloni, et al., "Key Factors for Enhanced Results of Matrix Stimulation Treatments," SPE 17154, Feb. 1988.
Paccaloni, et al., "Advances in Matrix Stimulation Technology," SPE 20623, Mar. 1993.
Nguyen, et al., Controlling Proppant Flowback in High-Temperature, High-Production Wells, SPE 82215, May 2003.
Dusterhoft, et al., Maximizing Effective Proppant Permeability under High-Stress, High Gas-Rate Conditions, SPE 90398, Sep. 2004.
Yang, et al., "Experimental Study on Fracture Initiation by Pressure Pulse," SPE 63035, Oct. 2000.
Search Report and Written Opinion of International Application No. PCT/GB2008/000476, Feb. 8, 2008.
Office Action for U.S. Appl. No. 12/640,558 dated Nov. 30, 2010.

* cited by examiner

METHODS OF COMPLETING WELLS FOR CONTROLLING WATER AND PARTICULATE PRODUCTION

BACKGROUND

The present disclosure relates to methods of completing wells in subterranean formations, such as in unconsolidated subterranean formations. More particularly, the present disclosure relates to methods of completing wells in unconsolidated subterranean formations for controlling water and particulate production.

Before desirable fluids (e.g., oil, gas, etc.) may be produced from a well bore that has been drilled into a subterranean formation, the well typically must be completed. Well completions may involve a number of stages, including the installation of additional equipment into the well and the performance of procedures to prepare the well for production. By way of example, well completions may include perforating casing that is cemented into the well bore so that fluids can flow, for example, from the formation and into the well bore. Completing the well may also include the installation of production tubing inside the well bore through which fluids may be produced from the bottom of the well bore to the surface. Well completions also may involve a number of other procedures performed in the well and to the surrounding formation, for example, to address issues related to undesired particulate and water production.

Additional procedures also may be needed when wells are completed in certain portions of a subterranean formation, such as in unconsolidated subterranean formations, to prevent undesirable particulate production. As used in this disclosure, the phrase "unconsolidated subterranean formation" refers to a subterranean formation that contains loose particulates and/or particulates bonded with insufficient bond strength to withstand forces created by the production (or injection) of fluids through the formation. These particulates present in the unconsolidated subterranean formation may include, for example, sand, crushed gravel, crushed proppant, fines, and the like. When the well is placed into production, these particulates may migrate out of the formation with the fluids produced by the wells. The presence of such particulates in produced fluids may be undesirable in that the particulates may, for example, abrade downhole and surface equipment (e.g., pumps, flow lines, etc.) and/or reduce the production of desired fluids from the well. By way of example, the migrating particulates may clog flow paths, such as formation pores, perforations, and the like, thereby reducing production.

A number of well completion techniques have been developed to control particulate production in unconsolidated subterranean formations. One technique of controlling particulate production includes placing a filtration bed containing gravel (e.g., a "gravel pack") near the well bore to provide a physical barrier to the migration of particulates with the production (or injection) of fluids. Typically, such "gravel-packing operations" involve the pumping and placement of a quantity of gravel into the unconsolidated formation in an area adjacent to a well bore. One common type of gravel-packing operation involves placing a screen in the well bore and packing the surrounding annulus between the screen and the well bore with gravel of a specific size designed to prevent the passage of formation sand. The screen is generally a filter assembly used to retain the gravel placed during the gravel-pack operation.

Another technique used to control particulates in unconsolidated formations involves application of a consolidating fluid (e.g., resins, tackifiers, etc.) to consolidate portions of the unconsolidated formation into stable, permeable masses. In general, the consolidating fluid should enhance the grain-to-grain (or grain-to-formation) contact between particulates in the treated portion of the subterranean formation so that the particulates are stabilized, locked in place, or at least partially immobilized such that they are resistant to flowing with produced or injected fluids.

In addition, the undesired production of water may constitute a major expense in the production of hydrocarbons from subterranean formations, for example, due to the energy expended in producing, separating, and disposing of the water. In addition, when produced through unconsolidated subterranean formations, the water may also have an undesirable effect on the migration of formation sands. While wells are typically completed in hydrocarbon-producing formations, a water-bearing zone may occasionally be adjacent to the hydrocarbon-producing formation. In some instances, the water may be communicated with the hydrocarbon-producing formation by way of fractures and/or high-permeability streaks. In addition, undesired water production may be caused by a variety of other occurrences, including, for example, water coning, water cresting, bottom water, channeling at the well bore (e.g., channels behind casing formed by imperfect bonding between cement and casing), and the like.

Accordingly, well completions may include procedures to address issues that may be encountered with the undesired production of water. One attempt to address these issues has been to inject sealing compositions into the formation to form an artificial barrier between the water-bearing zone and the hydrocarbon-producing formation. By way of example, a gelable fluid may be introduced into the formation in a flowable state and thereafter form a gel in the formation that plugs off formation flow paths to eliminate, or at least reduce, the flow of water. Crosslinkable gels have also been used in a similar manner. In addition, certain polymers (commonly referred to as "relative-permeability modifiers") may be used to reduce the formation's effective permeability to water without a comparable reduction in the formation's effective permeability to hydrocarbons. The use of relative-permeability modifiers may be desirable, for example, where hydrocarbons will be produced from the treated portion of the formation.

SUMMARY

The present disclosure relates to methods of completing wells in subterranean formations, such as in unconsolidated subterranean formations. More particularly, the present disclosure relates to methods of completing wells in unconsolidated subterranean formations for controlling water and particulate production.

An exemplary embodiment of the present invention provides a method of completing a well. The method comprises forming an artificial barrier to water flow, wherein the artificial barrier is located at or above a hydrocarbon-water interface between a water-bearing formation zone and a hydrocarbon-bearing formation zone. The method further comprises consolidating a portion of the hydrocarbon-bearing formation zone, wherein the artificial barrier is located between the consolidated portion of the hydrocarbon-bearing formation zone and the Water-bearing formation zone.

Another exemplary embodiment of the present invention provides a method of completing a well for controlling water and particulate production. The method comprises identifying a hydrocarbon-water interface between a hydrocarbon-bearing formation zone and a water-bearing formation zone.

The method further comprises perforating a first interval of a casing, and introducing a sealing composition into one or more subterranean formations surrounding the first interval to form an artificial barrier to water flow. The artificial barrier is located either at or above the hydrocarbon-water interface. The method further comprises perforating a second interval of the casing, wherein the second interval is located above the first interval. The method further comprises introducing a consolidating fluid into one or more subterranean formations surrounding the second interval so as to consolidate at least a portion of the one or more subterranean formations.

Another exemplary embodiment of the present invention provides a method of completing a well for controlling water and particulate production. The method comprises positioning a jetting tool at a first location in a well bore and perforating a first interval of casing at the first location. The perforating of the first interval comprises using the jetting tool to form one or more perforations that penetrate through the casing. The method further comprises introducing a sealing composition through the jetting tool and into one or more subterranean formations surrounding the first interval to form an artificial barrier to water flow. Either the artificial barrier is adjacent to a hydrocarbon-water interface between a hydrocarbon-bearing formation zone and a water-bearing formation zone, or a bottom of the artificial barrier is located no more than about ten feet above the hydrocarbon-water interface. The method further comprises positioning the jetting tool in the well bore at a second location above the first location, and perforating a second interval of casing at the second location in the well bore. The perforating of the second interval comprises using the jetting tool to form one or more perforations that penetrate through the casing. The method further comprises introducing a consolidating fluid through the jetting tool and into one or more subterranean formations surrounding the second interval so as to consolidate at least a portion of the one or more subterranean formations.

The features and advantages of the present invention will be apparent to those skilled in the art upon reading the following description of specific embodiments with reference to the accompanying drawings.

DRAWINGS

These drawings illustrate certain aspects of the present invention disclosure and should not be used to limit or define the invention.

DETAILED DESCRIPTION OF SPECIFIC EMBODIMENTS

The present disclosure relates to methods of completing wells in subterranean formations, such as in unconsolidated subterranean formations. More particularly, the present disclosure relates to methods of completing wells in unconsolidated subterranean formations for controlling water and particulate production.

I. Exemplary Well Completion

Figure 1:
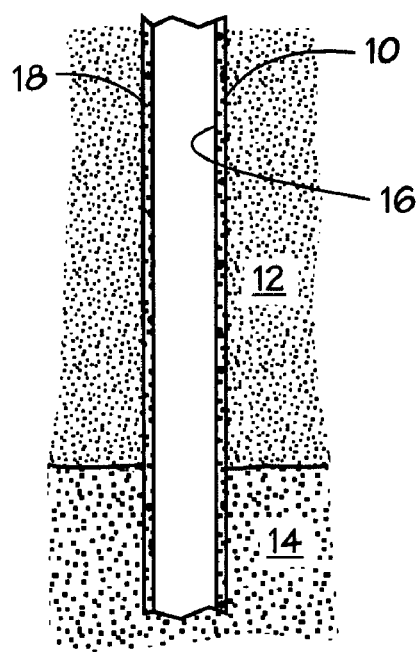
FIG. 1 is a cross-sectional, side view of a subterranean formation that is penetrated by a cased well bore, in accordance with exemplary embodiments of the present invention.

Turning to the drawings and referring first to FIG. 1, a well bore 10 is shown that penetrates a hydrocarbon-bearing zone 12 and a water-bearing zone 14. Even though FIG. 1 depicts the well bore 10 as a vertical well bore, the methods of the present invention may be suitable for use in deviated or otherwise formed portions of wells. Moreover, as those of ordinary skill in the art will appreciate, exemplary embodiments of the present invention are applicable for the treatment of both production and injection wells. In the illustrated embodiment, well bore 10 is lined with casing 16 that is cemented to the subterranean formation by cement 18. Those of ordinary skill in the art will appreciate the circumstances when well bore 10 should or should not be cased and whether such casing should or should not be cemented.

At least a portion of the hydrocarbon-bearing zone 12 may be an unconsolidated formation that contains loose particulates and/or particulates bonded with insufficient bond strength to withstand forces created by the production of fluids through the formation. Accordingly, when the well is completed and the hydrocarbon-bearing zone 12 is placed into production, these particulates may undesirably migrate out of the formation with the fluids produced by the well. Moreover, as illustrated, the hydrocarbon-bearing zone 12 may be adjacent to a water-bearing zone 14. Due to openings into the well bore 10 by perforations, channels behind the casing 16 resulting from incomplete bonding between the casing 16 and the cement 18, fractures, high-permeability streaks, or a variety of other occurrences (e.g., water coning, water cresting, etc.), undesired water production from the water-bearing zone 14 may also occur when the hydrocarbon-bearing zone 12 is placed into production. Exemplary embodiments of the present invention generally address these issues of particulate and water production through successive treatments of different formation intervals with a sealing composition to form an artificial barrier that prevents water flow and with a consolidating fluid to control particulate production.

Figure 2:
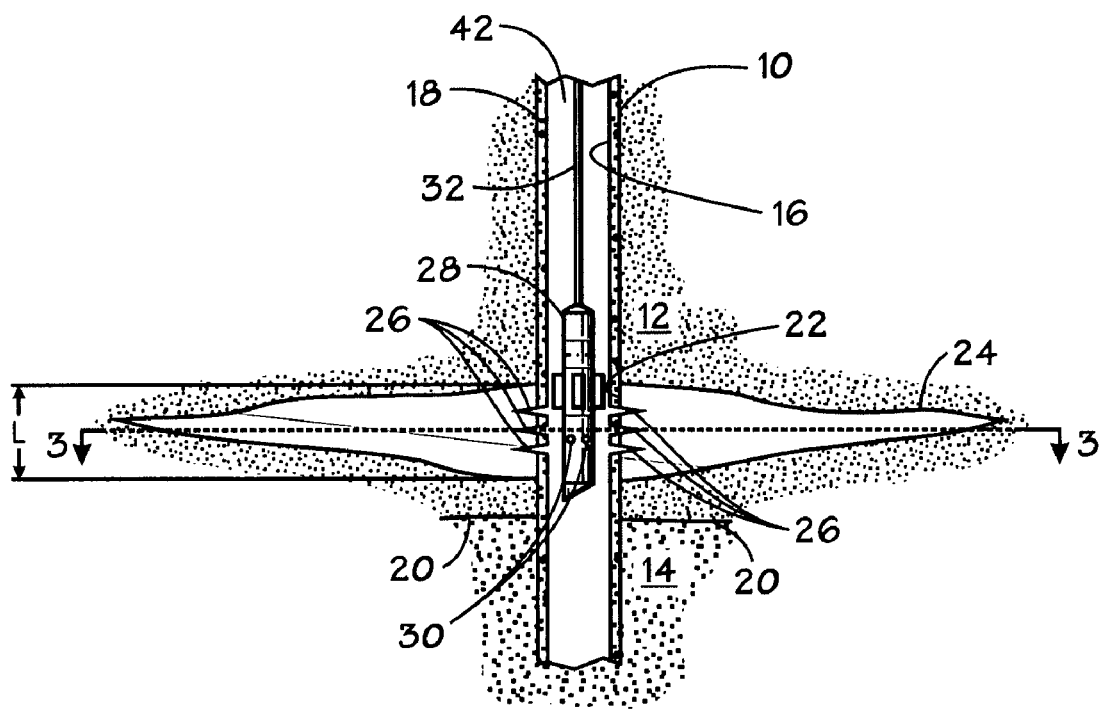
FIG. 2 is a cross-sectional, side view of the subterranean formation of FIG. 1 after treatment with a sealing composition to form an artificial barrier, in accordance with exemplary embodiments of the present invention.
Figure 3:
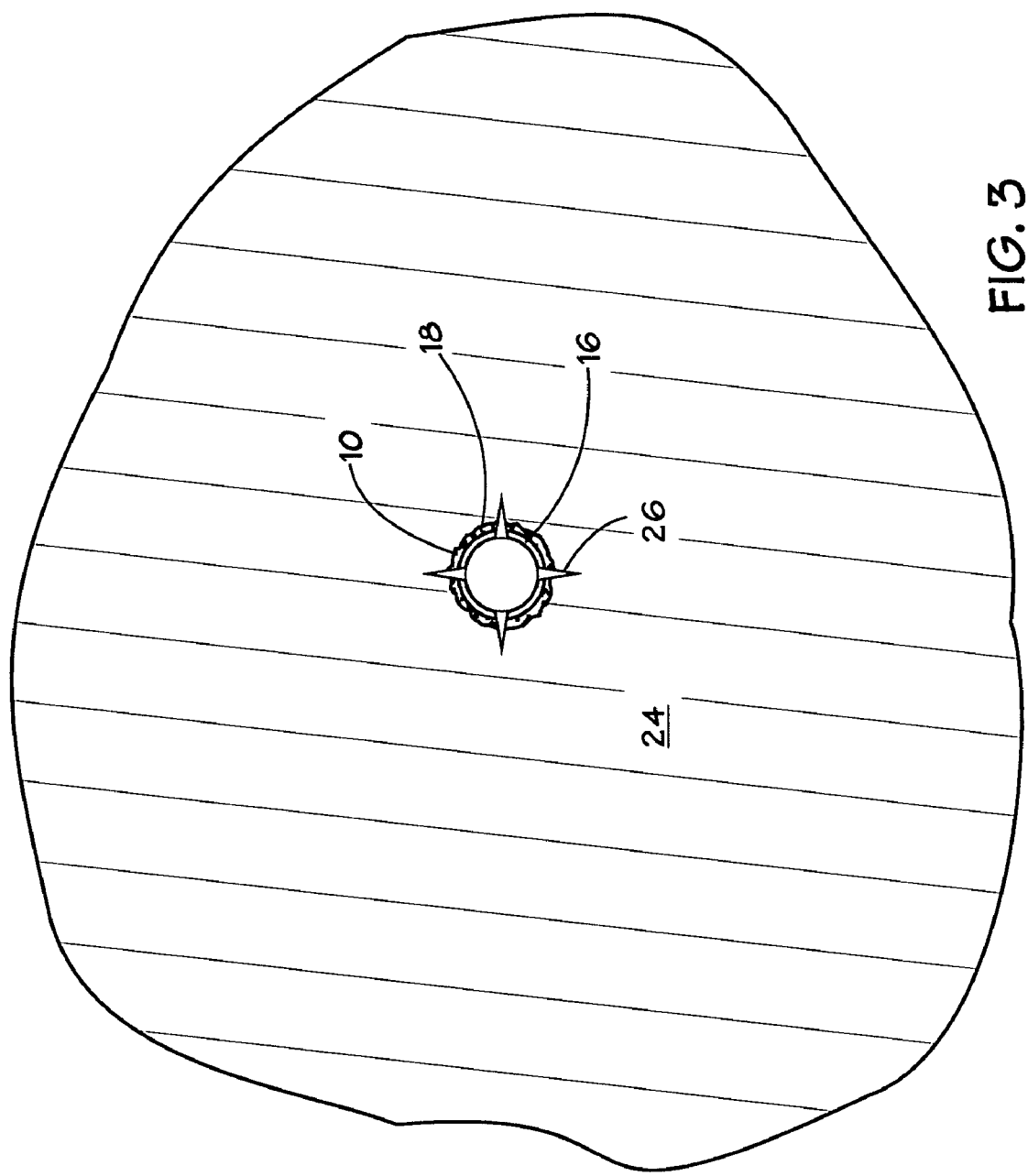
FIG. 3 is a cross-sectional, top view of the treated subterranean formation of FIG. 2 taken along line 3-3, in accordance with exemplary embodiments of the present invention.

Referring now to FIGS. 2 and 3, in accordance with exemplary embodiments of the present invention, completion of the well may include identifying the location of the hydrocarbon-water interface 20, perforating a first interval 22 of the well bore 10, and introducing a sealing composition into the portion of the subterranean formation surrounding the first interval 22 so that an artificial barrier 24 to water flow is formed. Those of ordinary skill in the art will appreciate that identification of the hydrocarbon-water interface 20 may include identifying the location of the water-bearing zone 14 so that the location of the hydrocarbon-water interface 20 may be identified. In addition, the location of the water-bearing zone 14 and the location of the hydrocarbon-water interface 20 may be identified using any suitable technique, including, for example, logging after a well bore is drilled or logging while drilling.

While FIG. 2 depicts the first interval 22 as being above the hydrocarbon-water interface 20, those of ordinary skill in the art will appreciate that the first interval 22 may be at any suitable location for the formation of the artificial barrier 24 to water flow. In certain exemplary embodiments, the artificial barrier 24 may be formed at the hydrocarbon-water interface. In another embodiment, the bottom of the artificial barrier 24 may be located about five feet, about ten feet or even greater above the hydrocarbon-water interface 20, for example, to effectively control water coning or cresting. Moreover, in certain exemplary embodiments, placing the top of the artificial barrier 24 above the hydrocarbon-water interface 20 should prevent the flow of water from the water-bearing zone 14 to the hydrocarbon-bearing zone 12. In certain exemplary embodiments, the artificial barrier 24 may overlap the hydrocarbon water interface 20. Accordingly, the first interval 22 may be located at a distance above (e.g., within about five feet, ten feet or greater) the hydrocarbon-water interface 20. Moreover, the first interval 22 may have any suitable length (L) for the desired treatment. By way of example, the first interval 22 may have a length (L) in the range of from about 1 foot to about 50 feet.

As previously mentioned, exemplary embodiments of the present invention may include perforating a first interval 22 of the well bore 10. In the illustrated embodiment, perforations 26 may be formed that penetrate through the casing 16 and the cement sheath 18 and into the formation. As will be discussed in more detail below, the portion of the hydrocarbon-bearing zone 12 surrounding the first interval 22 may then be treated through the perforations 26 with a sealing composition to form an artificial barrier 24 to prevent, or at least substantially reduce, the migration of water from the water-bearing zone 14 to the hydrocarbon-bearing zone 12.

While the first interval 22 may be perforated using any suitable technique, an exemplary embodiment utilizes a jetting tool 28, as illustrated by FIG. 2. Jetting tool 28 may be any suitable assembly for use in subterranean operations through which a fluid may be jetted at high pressures. By way of example, when used to form the perforations 26, the jetting tool 28 should be configured to jet a fluid against the casing 16 and the cement sheath 18 such that perforations 26 may be formed. As illustrated, jetting tool 28 may contain ports 30 for discharging a fluid from the jetting tool 28. In some exemplary embodiments, the ports 30 form discharge jets as a result of a high pressure fluid forced out of relatively small ports. In other exemplary embodiments, fluid jet forming nozzles may be connected within the ports 30. Examples of suitable jetting tools are described in U.S. Pat. Nos. 5,765,642 and 5,499,678, the disclosures of which are incorporated herein by reference. In operation, the jetting tool 28 may be positioned in the well bore 10 adjacent the portion of the well bore 10 to be perforated, such as the first interval 22. As illustrated, the jetting tool 28 may be coupled to a work string 32 (e.g., piping, coiled tubing, etc.) and lowered into the well bore 10 to the desired position. Once the jetting tool 28 has been so positioned, a fluid may be pumped down through the work string 32, into the jetting tool 28, out through the ports 30, and against the interior surface of the casing 16 causing perforations 26 to be formed through the casing 16 and the cement sheath 18. Those of ordinary skill in the art will appreciate that abrasives (e.g., sand) may be included in the jetted fluid.

In accordance with exemplary embodiments, a sealing composition may be introduced into the portion of the subterranean formation surrounding the first interval 22 so that an artificial barrier 24 to water flow is formed. In general, the sealing composition may be any suitable composition suitable for forming an artificial barrier (such as artificial barrier 24) to water flow in the treated portion of the subterranean formation such that the flow of water therethrough is eliminated or at least substantially reduced. In certain exemplary embodiments, the sealing composition should form a substantially impenetrable barrier that eliminates, or at least partially reduces, the migration of any fluids between the water-bearing zone 14 and the hydrocarbon-bearing zone 12, or vice versa. By way of example, the sealing composition should be able to penetrate into the formation and form an artificial barrier therein that plugs off pore spaces to water flow. Examples of suitable sealing compositions are described in more detail below.

Any suitable technique may be used for the delivery of the sealing composition into the portion of the hydrocarbon-bearing zone 12 surrounding the first interval 22. For example, bull heading, coil tubing or jointed pipe (e.g., with straddle packers, jetting tools, etc.), or any other suitable technique may be used. In certain exemplary embodiments, the sealing composition may be injected into the hydrocarbon-bearing formation 12 by the jetting tool 28 while the jetting tool 28 is still in position in the well bore 10. For example, as illustrated by FIG. 2, the jetting tool 28 may be used for the delivery of the sealing composition into the portion of the hydrocarbon-bearing formation 12 that surrounds the first interval 22. Utilization of jetting tool 28 may reduce the need for equipment, such as packers, to isolate the treated interval (e.g., first interval 22). Alternatively, the sealing composition may be injected through the annulus 42 between the work string 32 and the casing 16. It should be noted that, to reduce the potential for the undesired fracturing of the first interval 22, the sealing composition may be introduced into the hydrocarbon-bearing formation 12 at matrix flow rates. By way of example, the sealing composition may be introduced at a flow rate in the range of from about 0.25 barrels to about 3 barrels per minute, depending, for example, on the length of the first interval 22. However, those of ordinary skill in the art will appreciate that these flow rates are merely exemplary, and the present invention is applicable to flow rates outside these ranges.

In addition, a sufficient amount of the sealing composition should be introduced such that the sealing composition has the desired penetration into the formation. In accordance with exemplary embodiments, it may be desired for the sealing composition to penetrate deep into the formation so that a sufficient artificial barrier 24 to water flow is formed. By way of example, a sufficient amount of the sealing composition may be introduced such that it penetrates in the range of from about 5 feet to about 50 feet into the formation. However, as those of ordinary skill in the art will appreciate, the depth of penetration of the sealing composition into the formation will vary, for example, based on the particular application.

Figure 4:
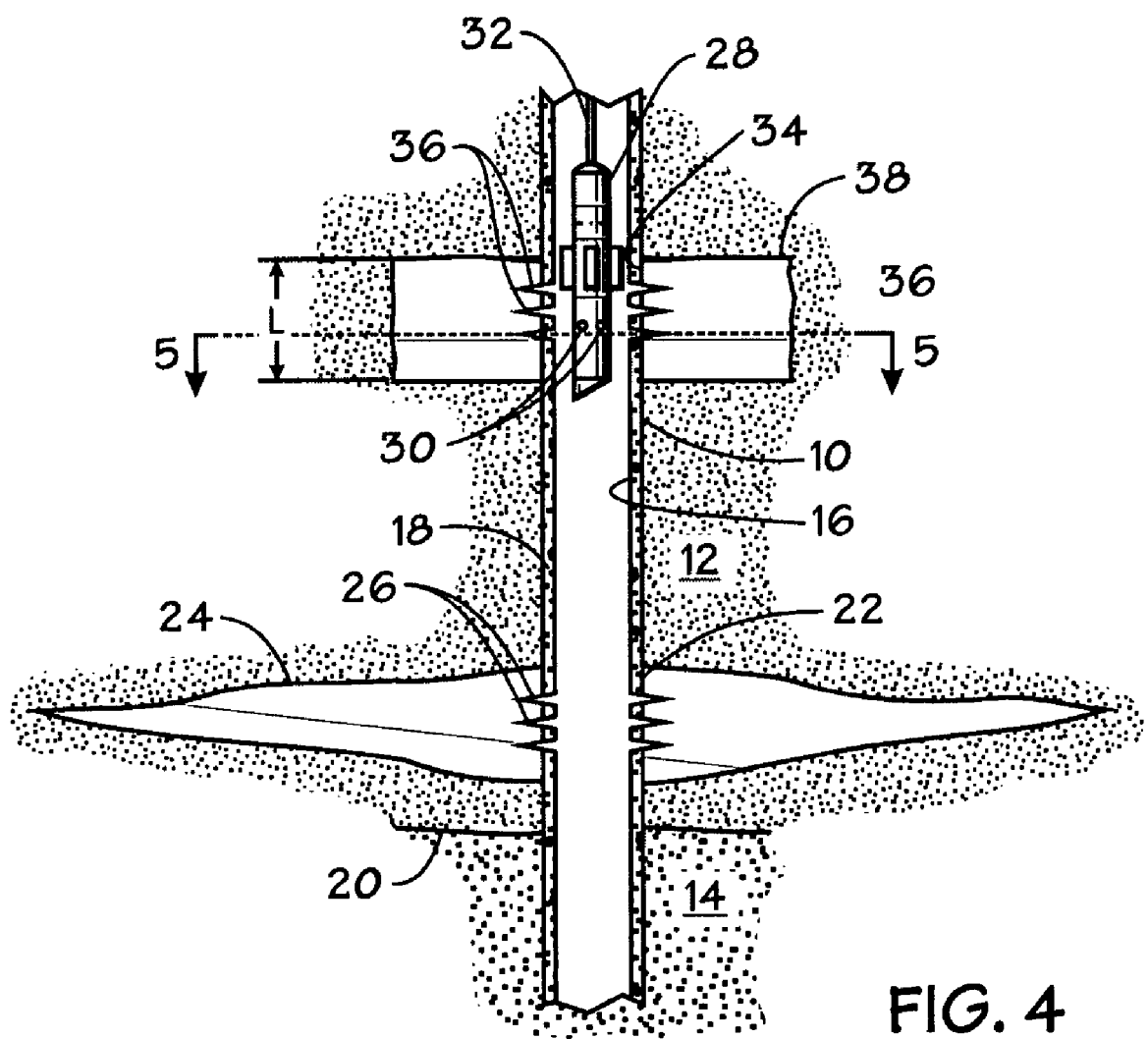
FIG. 4 is a cross-sectional, side view of the treated subterranean formation of FIG. 2 after additional treatment with a consolidating fluid, in accordance with exemplary embodiments of the present invention.
Figure 5:
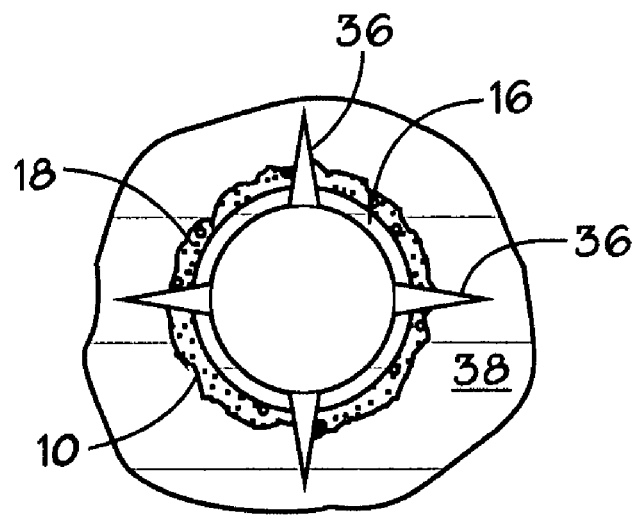
FIG. 5 is a cross-sectional, top view of the treated subterranean formation of FIG. 4 taken along line 5-5, in accordance with exemplary embodiments of the present invention.

Referring now to FIGS. 4 and 5, exemplary embodiments of the present invention may comprise perforating a second interval 34 of the well bore 10, and introducing a consolidating fluid into the portion of the subterranean formation surrounding the second interval 34. In general, the second interval 34 may be located above the first interval 22 so that the artificial barrier 24 prevents, or at least substantially reduces, water flow from the water-bearing formation 14 to the portion of the hydrocarbon bearing zone 12 surrounding the second interval 34. In this manner, the undesired production of water and particulates may be controlled once the well is put on production, in accordance with exemplary embodiments. Moreover, the second interval 34 may have any suitable length (L) for the desired consolidation and production rate. Those of ordinary skill in the art will appreciate that the (L) of the second interval 34 will vary based on a number of factors, including, for example, costs and the desired production rate.

As previously mentioned, exemplary embodiments of the present invention may include perforating the second interval 34 of the well bore 10. In the illustrated embodiment, perforations 36 may be formed in the second interval 34 that penetrate through the casing 16 and the cement sheath 18 and into the formation. As will be discussed in more detail below, the portion of the hydrocarbon-bearing zone 12 surrounding the second interval 34 may then be treated through the perforations 36 with a consolidating fluid for controlling particulate production. While the second interval 34 may be perforated using any suitable technique, an exemplary embodiment utilizes the jetting tool 28. Exemplary embodiments of the jetting tool 28 are described above with respect to perforating the first interval 22. In operation, the jetting tool 28 may be positioned in the well bore 10 adjacent the portion of the well bore 10 to be perforated, such as the second interval 34. By way of example, the jetting tool 28 may be raised from the first interval 22 to the second interval 34. Once the jetting tool 28 has been so positioned, a fluid may be pumped down through the work string 32, into the jetting tool 28, out through the ports 30, and against the interior surface of the casing 16 causing the perforations 36 to be formed through the casing 16 and the cement sheath 18. Those of ordinary skill in the art will appreciate that abrasives (e.g., sand) may be included in the jetted fluid.

In accordance with exemplary embodiments, a consolidating fluid may be introduced into the portion of the subterranean formation surrounding the second interval 34 to consolidate the treated portion of the formation into a consolidated region 38. In general, the consolidating fluid should be any suitable fluid for enhancing the grain-to-grain (or grain-to-formation) contact between particulates in the treated portion of the subterranean formation so that the particulates are stabilized, locked in place, or at least partially immobilized such that they are resistant to flowing with produced or injected fluids. Accordingly, after treatment with the consolidating fluid, the particulates in the consolidated region 38 should be inhibited from migrating with any subsequently produced or injected fluids. Examples of suitable consolidated fluids are described in more detail below.

Any suitable technique may be used for the delivery of the consolidating fluid into the second interval 34, for example, bull heading, coil tubing or jointed pipe (e.g., with straddle packers, jetting tools, etc.), or any other suitable technique may be used. By way of example, as illustrated by FIG. 4, the jetting tool 28 may be used for the delivery of the consolidating fluid into the portion of the hydrocarbon-bearing zone 12 that surrounds the second interval 34. Utilization of the jetting tool 28 may reduce the need for additional equipment (e.g., packers) to isolate the second interval 34. In addition, utilization of the jetting tool 28 in the performance of these steps also may reduce the number of trips into the well bore 10, which in turn may reduce the time and expense of the well completion. Moreover, use of jetting tool 28 to introduce consolidating fluid may also reduce equipment needed to place the fluid, while reducing horsepower requirements. It should be noted that, to reduce the potential for the undesired fracturing of the second interval 34, the consolidating fluid may be introduced into the hydrocarbon-bearing formation 12 at matrix flow rates. By way of example, the consolidating fluid may be introduced at a flow rate in the range of from about 0.25 barrels to about 3 barrels per minute, depending on, for example, the length of perforated interval. However, those of ordinary skill in the art will appreciate that these flow rates are merely exemplary, and the present invention is applicable to flow rates outside these ranges.

Additionally, the consolidating fluid should achieve sufficient penetration into the formation for the particular application. As illustrated, the consolidating fluid may be introduced into the near well bore portion of the formation surrounding the second interval 34. For example, consolidation of the near well bore portion of the formation may alleviate potential problems associated with particulate production and thus help to control such undesired particulate production. Those of ordinary skill in the art will understand that the "near well bore portion" of a formation generally refers to the portion of a subterranean formation surrounding a well bore. For example, the "near well bore portion" may refer to the portion of the formation surrounding a well bore and having a depth of penetration of from about 1 to about 3 well bore diameters. However, as those of ordinary skill in the art will appreciate, the depth of penetration of the consolidating fluid into the formation may vary based on the particular application.

While specific reference is made in the above discussion to treatment of the first interval 22 with the sealing composition followed by treatment of the second interval 34 with the consolidating fluid, it should be appreciated that this invention is not limited to such order of treatment. By way of example, the order of treatment may be reversed in that treatment of the second interval 34 with the consolidating fluid may occur prior to treatment of the first interval 22 with the sealing composition.

It should be noted that, after placement of the consolidating fluid into the formation, the well bore 10 optionally may be shut in for a period of time. The shutting in of the well bore 10 for a period of time may, inter alia, enhance the coating of the consolidating fluid onto the particulates and minimize the washing away of the consolidating fluid during any later subterranean operations. The necessary shut-in time period is dependent, among other things, on the composition of the consolidating fluid used and the temperature of the formation. Generally, the chosen period of time may be between about 0.5 hours and about 72 hours or longer. Determining the proper period of time to shut in the formation is within the ability of one skilled in the art with the benefit of this disclosure.

Those of ordinary skill in the art will appreciate that introduction of the consolidating fluid into the portion of the formation surrounding the second interval 34 may result in diminishing the formation's permeability. Reduction in permeability due to the consolidating fluid is based on a variety of factors, including the particular consolidating fluid used, the viscosity of the consolidating fluid, the volume of the consolidating fluid, volume of any after-flush treatment fluid, and the pumpability of the formation. However, in some exemplary embodiments, so that fluids may be produced from, and/or injected through, the consolidated region 38, it may be desired to at least partially restore permeability to the consolidated region 38 after this treatment. In certain exemplary embodiments, a fracturing step may be used to reconnect the well bore 10 with portions of the formation outside the consolidated region 38.

Figure 6:
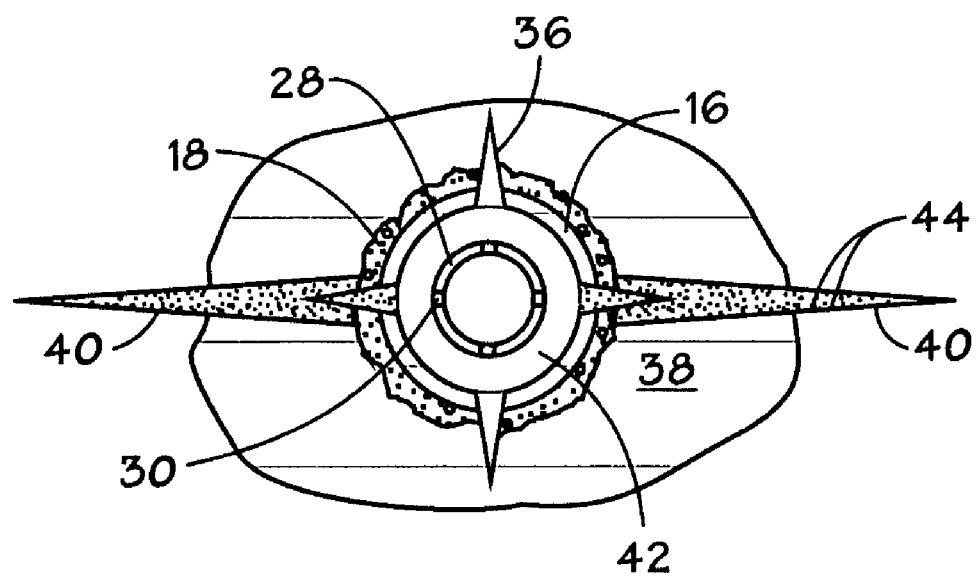
FIG. 6 is a cross-sectional, top view of the treated subterranean formation of FIG. 4 taken along line 5-5, after an additional fracturing treatment, in accordance with exemplary embodiments of the present invention.

Referring now to FIG. 6, one or more fractures 40 may be created or enhanced through the consolidated region 38 and into the surrounding formation to at least partially restore effective permeability to the consolidated region. As used in this disclosure, the term "enhancing" a fracture refers to the extension or enlargement of a natural or previously created fracture in the formation. The fracturing step may be accomplished by any suitable methodology. By way of example, a hydraulic-fracturing treatment may be used that includes introducing a fracturing fluid into the consolidated region 38 at a pressure sufficient to create or enhance one or more fractures 40. In certain exemplary embodiments, the fracturing step may utilize the jetting tool 28. By way of example, the jetting tool 28 may be used to initiate one or more fractures 40 in the consolidated region 38 by way of jetting a fluid through the perforations 36 and against the consolidated region 38. A fracturing fluid may also be pumped down through the annulus 42 between the work string 32 and the casing 16 and then into the consolidated region 38 at a pressure sufficient to create or enhance the one or more fractures 40. The fracturing fluid may be pumped down through the annulus 42 concurrently with the jetting of the fluid. One example of a suitable fracturing treatment is CobraMax$^{SM}$ Fracturing Service, available from Halliburton Energy Services, Inc. In certain exemplary embodiments, the fracturing fluid may comprise a viscosified fluid (e.g., a gel or a crosslinked gel). In certain embodiments, the fracturing fluid further may comprise proppant 44 that is deposited in the one or more fractures 40 to generate propped fractures. In certain exemplary embodiments, the proppant 44 may be coated with a consolidating agent (e.g., a curable resin, a tackifying agent, etc.) so that the coated proppant forms a bondable, permeable mass in the one or more fractures 40, for example, to mitigate proppant flow back when the well is placed into production. By way of example, the proppant may be coated with an Expedite™ resin system, available from Halliburton Energy Services, Inc.

Alternatively, or in addition to the fracturing treatment, one or more after-flush fluids may be used to at least partially restore permeability to the consolidated region 38, if desired. When used, the after-flush fluid may be introduced into the consolidated region 38 while the consolidating fluid is still in a flowing state. Among other things, the after-flush fluid generally acts to displace at least a portion of the consolidating fluid from flow paths in the consolidated region 38 and to force the displaced portions of the consolidating fluid further into the formation where it may have negligible impact on subsequent production. However, sufficient amounts of the consolidating fluid should remain in the consolidated region 38 to provide effective stabilization of the particulates therein. Generally, the after-flush fluid may be any fluid that does not undesirably react with the other components used or the subterranean formation. For example, the after-flush fluid may be an aqueous-based fluid, a non-aqueous based fluid (e.g., kerosene, toluene, diesel, or crude oil), or a gas (e.g., nitrogen or carbon dioxide).

Optionally, one or more pre-flush fluids may be introduced into the portion of the hydrocarbon-bearing zone 12 surrounding second interval 34. By way of example, the pre-flush fluid may be introduced into the formation to, for example, cleanout undesirable substances (e.g., oil, residue, or debris) from pore spaces in the matrix of the formation and/or to prepare the formation for subsequent placement of the consolidating fluid. In exemplary embodiments, an acidic pre-flush fluid may be used to, for example, dissolve undesirable substances in the formation. Examples of suitable pre-flush fluids include aqueous-based fluid, a non-aqueous based fluid (e.g., kerosene, xylene, toluene, diesel, or crude oil), or a gas (e.g., nitrogen or carbon dioxide). Aqueous-based fluids may comprise fresh water, salt water, brines, sea water, or combinations thereof. Further, one or more surfactants may be present in the pre-flush fluid, e.g., to aid a consolidating fluid in flowing to contact points between adjacent particulates in the formation.

II. Exemplary Sealing Compositions

In accordance with exemplary embodiments, a sealing composition may be introduced into a portion of a subterranean formation to form an artificial barrier to water flow. As described above, the artificial barrier typically may be located between the water-bearing zone and the hydrocarbon-bearing zone so as to minimize the undesired production of water from the hydrocarbon-bearing zone. In general, the sealing composition may be any composition suitable for forming an artificial barrier in the treated portion of the subterranean formation such that the flow of water therethrough is eliminated or at least substantially reduced. Examples of suitable sealing compositions may include tackifying fluids, resin compositions, and gelable compositions. In addition, examples of suitable sealing compositions may include fluids that comprise relative-permeability modifiers. As used in this disclosure, the phrase "relative-permeability modifier" refers to compounds that should reduce a formation's effective permeability to water without a comparable reduction in the formation's effective permeability to hydrocarbons. Those of ordinary skill in the art will appreciate that these sealing compositions are merely exemplary, and the present invention is applicable to other compositions for forming a suitable artificial barrier to the flow of water. Examples of suitable sealing compositions will be described in more detail as follows.

A. Exemplary Tackifying Fluids

As previously mentioned, an exemplary embodiment of the sealing compositions used in the present invention may comprise a tackifying agent. Suitable tackifying agents are substances that are (or may be activated to become) tacky and thus adhere to unconsolidated particulates in the subterranean formation. In this manner, the tackifying agent may form a barrier in the treated portion of the formation. Suitable tackifying agents may not be significantly tacky when placed into the formation, but may be capable of being "activated" (that is destabilized, coalesced and/or reacted) to transform into a tacky compound at a desirable time. Such activation may occur before, during, or after the introduction of the tackifying fluid into the subterranean formation.

One type of tackifying agent suitable for use includes a non-aqueous tackifying agent. An example of a suitable non-aqueous tackifying agent comprises polyamides that are liquids or in solution at the temperature of the formation such that they are, by themselves, non-hardening when introduced into the subterranean formation. One exemplary embodiment of a suitable tackifying agent comprises a condensation reaction product that comprises commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. An example of a suitable non-aqueous tackifying agent is Sand Wedge® Enhancement System, available from Halliburton Energy Services, Inc.

Additional exemplary compounds which may be used as non-aqueous tackifying agents include liquids and solutions of, for example, polyesters, polycarbonates and polycarbamates, natural resins such as shellac and the like. Other suitable non-aqueous tackifying agents are described in U.S. Pat. Nos. 5,853,048 and 5,833,000, the disclosures of which are incorporated herein by reference.

Non-aqueous tackifying agents may be either used such that they form a non-hardening coating or they may be combined with a multifunctional material capable of reacting with the tackifying compound to form a hardened coating. A "hardened coating" as used in this disclosure means that the reaction of the tackifying compound with the multifunctional material will result in a substantially non-flowable reaction product that exhibits a higher compressive strength in a consolidated agglomerate than the tackifying compound alone with the particulates. In this instance, the tackifying agent may function similarly to a hardenable resin.

Multifunctional materials suitable for use in the present invention include aldehydes, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde, aldehyde condensates, and silyl-modified polyamide compounds and the like, and combinations thereof. Suitable silyl-modified polyamide compounds that may be used in exemplary embodiments of the present invention include those that are substantially self-hardening compositions capable of at least partially adhering to particulates in the unhardened state, and that are further capable of self hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water.

In some exemplary embodiments, the multifunctional material may be mixed with the tackifying agent in an amount of from about 0.01 to about 50 percent by weight of the tackifying agent to effect formation of the reaction product. In some exemplary embodiments, the multifunctional material may be present in an amount of from about 0.5 to about 1 percent by weight of the tackifying compound. Suitable multifunctional materials are described in U.S. Pat. No. 5,839,510, the disclosure of which is incorporated herein by reference.

Solvents suitable for use with the tackifying agents include any solvent that is compatible with the tackifying agent and achieves the desired viscosity effect. The solvents that can be used in exemplary embodiments of the present invention preferably include those having high flash points (e.g., above about 125° F.). Examples of solvents suitable for use in exemplary embodiments of the present invention include butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

Another type of tackifying agent suitable for use in an exemplary embodiment of the present invention includes aqueous tackifying agents. As used in this disclosure, the term "aqueous tackifying agent" refers to a tackifying agent that is soluble in water. Examples of suitable aqueous tackifying agents generally comprise charged polymers, that when in an aqueous solvent or solution, enhance the grain-to-grain contact between the individual particulates within the formation (e.g., proppant, gravel particulates, formation particulates, or other particulates), and may help bring about the consolidation of the particulates into a cohesive, flexible, and permeable mass. Examples of aqueous tackifying agents suitable for use in an exemplary embodiment of the present invention include acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester copolymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate copolymers, and acrylic acid/acrylamido-methyl-propane sulfonate copolymers, and combinations thereof. Examples of suitable aqueous tackifying agents are FDP-S706-3 and FDP-S800-05, which are available from Halliburton Energy Services, Inc. Examples of suitable aqueous tackifying agents are described in U.S. Pat. No. 7,131,491 and U.S. Pat. App. Pub. No. 2005/0277554, the disclosures of which are incorporated herein by reference.

Another example of a suitable aqueous tackifying agent comprises a benzyl coco di-(hydroxyethyl) quaternary amine, p-T-amyl-phenol condensed with formaldehyde, or a copolymer comprising from about 80% to about 100% $C_{1-30}$ alkylmethacrylate monomers and from about 0% to about 20%o hydrophilic monomers. In some exemplary embodiments, the aqueous tackifying agent may comprise a copolymer that comprises from about 90% to about 99.5% 2-ethylhexylacrylate and from about 0.5% to about 10% acrylic acid. Suitable hydrophilic monomers may be any monomer that will provide polar oxygen-containing or nitrogen-containing groups. Suitable hydrophilic monomers include dialkyl amino alkyl(meth)acrylates and their quaternary addition and acid salts, acrylamide, N-(dialkyl amino alkyl)acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. These copolymers can be made by any suitable emulsion polymerization technique. Examples of suitable tackifying agents are described in U.S. Pat. No. 5,249,627, the disclosure of which is incorporated herein by reference. Methods of producing these copolymers are disclosed in U.S. Pat. No. 4,670,501, the disclosure of which is incorporated herein by reference.

B. Exemplary Resin Compositions

Another example of a sealing composition that may be used in an exemplary embodiment of the present invention may comprise a resin. Resins suitable for use may include any suitable resin that is capable of forming a hardened, consolidated mass in the treated formation. The term "resin" as used herein includes any of numerous physically similar polymerized synthetics or chemically modified natural resins, including but not limited to thermoplastic materials and thermosetting materials. Many such resins are commonly used in subterranean consolidation operations, and some suitable resins include two-component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and combinations thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (e.g., less than 250° F.) but will cure under the effect of time and temperature if the formation temperature is above about 250° F., preferably above about 300° F. It is within the ability of one skilled in the art, with the benefit of this disclosure, to select a suitable resin for use in exemplary embodiments of the present invention and to determine whether a catalyst is needed to trigger curing. An example of a suitable resin is Sand Trap® Formation Consolidation Service, available from Halliburton Energy Services, Inc.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

Any solvent that is compatible with the chosen resin and achieves the desired viscosity effect may be suitable for use with the resin. Some exemplary solvents are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, and combinations thereof. Other suitable solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin chosen and is within the ability of one skilled in the art with the benefit of this disclosure.

C. Exemplary Gelable Compositions

An example of sealing compositions that may be used in an exemplary embodiment of the present invention comprises gelable compositions. In general, suitable gelable compositions should cure to form a gel. Gelable compositions suitable for use in exemplary embodiments of the present invention include those compositions that cure to form a semi-solid, immovable, gel-like substance. Prior to curing, the gelable compositions should have low viscosities and be capable of flowing in pipe and into the subterranean formation. The gelable composition may be any gelable liquid composition capable of converting into a gelled substance that substantially plugs the permeability of the formation. Accordingly, once placed into the formation, the gelable composition should form the desired artificial barrier. Examples of suitable gelable compositions include gelable aqueous silicate compositions, crosslinkable aqueous polymer compositions, gelable resins and polymerizable organic monomer compositions. Examples of suitable gelable compositions will be described in more detail as follows.

1. Exemplary Gelable Aqueous Silicate Compositions

In certain exemplary embodiments, the gelable compositions may comprise a gelable aqueous silicate composition. Suitable gelable aqueous silicate compositions for barrier formation generally comprise aqueous alkali metal silicate solution and a catalyst (e.g., a temperature-activated catalyst) for gelling the aqueous alkali metal silicate solution. An example of a suitable gelable aqueous silicate composition is Injectrol™, which is available from Halliburton Energy Services, Inc. Examples of suitable gelable aqueous silicate compositions are described in U.S. Pat. No. 4,466,831, the disclosure of which is incorporated herein by reference.

The aqueous alkali metal silicate solution component of the gelable aqueous silicate compositions generally may comprise an aqueous liquid and an alkali metal silicate. The aqueous liquid component of the aqueous alkali metal silicate solution generally may be fresh water, salt water (e.g., water containing one or more salts dissolved therein), brine (e.g., saturated salt water), seawater, or any other aqueous liquid that does not adversely react with the other components used in accordance with this invention or with the subterranean formation. Examples of suitable alkali metal silicates include one or more of sodium silicate, potassium silicate, lithium silicate, rubidium silicate, or cesium silicate. While sodium silicate exists in many forms, the sodium silicate that may be used in the aqueous alkali metal silicate solution may have a $Na_2O$-to-$SiO_2$ weight ratio in the range of from about 1:2 to about 1:4. By way of example, the sodium silicate may have a $Na_2O$-to-$SiO_2$ weight ratio in the range of about 1:3.2. Generally, the alkali metal silicate may be present in the aqueous alkali metal silicate solution component in an amount in the range of from about 0.1% to about 10% by weight of the aqueous alkali metal silicate solution component.

The temperature-activated catalyst component of the gelable aqueous silicate compositions is used, inter alia, to convert the gelable aqueous silicate compositions into the desired semi-solid, gel-like substance described above. Selection of a temperature-activated catalyst is related, at least in part, to the temperature of the subterranean formation to which the gelable aqueous silicate composition will be introduced. The temperature-activated catalysts that can be used in the gelable aqueous silicate compositions of exemplary embodiments of the present invention include, but are not limited to, ammonium sulfate (which is most suitable in the range of from about 60° F. to about 240° F.); sodium acid pyrophosphate (which is most suitable in the range of from about 60° F. to about 240° F.); citric acid (which is most suitable in the range of from about 60° F. to about 120° F.); and ethyl acetate (which is most suitable in the range of from about 60° F. to about 120° F.). Generally, the temperature-activated catalyst may be present in the gelable aqueous silicate composition in the range of from about 0.1% to about 5% by weight of the gelable aqueous silicate composition.

2. Exemplary Crosslinkable Aqueous Polymer Compositions

In other exemplary embodiments, the gelable compositions may comprise a crosslinkable aqueous polymer composition. Suitable crosslinkable aqueous polymer compositions for barrier formation generally comprise an aqueous solvent, a crosslinkable polymer, and a crosslinking agent. Such compositions are similar to those used to form gelled treatment fluids, such as fracturing fluids, but, according to the methods of exemplary embodiments of the present invention, they are not exposed to breakers or de-linkers so they retain their viscous nature over time. Moreover, suitable compositions should generally be resistant to breaking, for example, due to formation temperatures. An example of a suitable crosslinkable polymer composition is H2-Zero™, which is commercially available from Halliburton Energy Services, Inc. Examples of suitable crosslinkable aqueous polymer compositions are described in U.S. Pat. Nos. 5,836,392, 6,192,986, and 6,196,317, the disclosures of which are incorporated herein by reference.

The aqueous solvent may be any aqueous solvent in which the crosslinkable composition and the crosslinking agent may be dissolved, mixed, suspended, or dispersed therein to facilitate gel formation. For example, the aqueous solvent used may be fresh water, salt water, brine, seawater, or any other aqueous liquid that does not adversely react with the other components used in accordance with exemplary embodiments of the present invention or with the subterranean formation.

Examples of crosslinkable polymers that can be used in the crosslinkable aqueous polymer compositions include carboxylate-containing polymers and acrylamide-containing polymers. Examples of suitable acrylamide-containing polymers include polyacrylamide, partially hydrolyzed polyacrylamide, copolymers of acrylamide and acrylate, copolymers of acrylamide and 2-acrylamido-2-methylpropanesulfonic acid, carboxylate-containing terpolymers and tetrapolymers of acrylate. Additional examples of suitable crosslinkable polymers include hydratable polymers comprising polysaccharides and derivatives thereof and that contain one or more of the monosaccharide unit's galactose, mannose, glucoside, glucose, xylose, arabinose, fructose, glucuronic acid, or pyranosyl sulfate. Suitable natural hydratable polymers include, but are not limited to, guar gum, locust bean gum, tara, konjak, tamarind, starch, cellulose, karaya, xanthan, tragacanth, and carrageenan, and derivatives of all of the above. Suitable hydratable synthetic polymers and copolymers that may be used in the crosslinkable aqueous polymer compositions include polyacrylates, polymethacrylates, polyacrylamides, maleic anhydride, methylvinyl ether polymers, polyvinyl alcohols, and polyvinylpyrrolidone. The crosslinkable polymer used should be included in the crosslinkable aqueous polymer composition in an amount sufficient to form the desired gelled substance in the subterranean formation. In some exemplary embodiments of the present invention, the crosslinkable polymer may be included in the crosslinkable aqueous polymer composition in an amount in the range of from about 1% to about 30% by weight of the aqueous solvent. In another exemplary embodiment of the present invention, the crosslinkable polymer may be included in the crosslinkable aqueous polymer composition in an amount in the range of from about 1% to about 20% by weight of the aqueous solvent.

The crosslinkable aqueous polymer compositions of exemplary embodiments of the present invention further comprise a crosslinking agent for crosslinking the crosslinkable polymers to form the desired gelled substance. In some exemplary embodiments, the crosslinking agent may be a molecule or complex containing a reactive transition metal cation. An exemplary crosslinking agent comprises trivalent chromium cations complexed or bonded to anions, atomic oxygen, or water. Examples of suitable crosslinking agents include compounds or complexes containing chromic acetate and/or chromic chloride. Other suitable transition metal cations include chromium VI within a redox system, aluminum III, iron II, iron III, and zirconium IV. Organic crosslinkers may also be suitable, in certain exemplary embodiments. Examples of suitable organic crosslinkers include polyalkyleneimines, polyalkylenepolyamines (e.g., polyethyleneimine), chitosan, and mixtures thereof.

The crosslinking agent should be present in the crosslinkable aqueous polymer compositions of exemplary embodiments of the present invention in an amount sufficient to provide, inter alia, the desired degree of crosslinking. In some exemplary embodiments of the present invention, the crosslinking agent may be present in the crosslinkable aqueous polymer compositions of the present invention in an amount in the range of from about 0.01% to about 5% by weight of the crosslinkable aqueous polymer composition. The exact type and amount of crosslinking agent or agents used depends upon the specific crosslinkable polymer to be crosslinked, formation temperature conditions, and other factors known to those individuals skilled in the art.

Optionally, the crosslinkable aqueous polymer compositions may further comprise a crosslinking delaying agent, such as a polysaccharide crosslinking delaying agent derived from guar, guar derivatives, or cellulose derivatives. The crosslinking delaying agent may be included in the crosslinkable aqueous polymer compositions, inter alia, to delay crosslinking of the crosslinkable aqueous polymer compositions until desired, such as after placement into the formation. One of ordinary skill in the art, with the benefit of this disclosure, will be able to determine appropriate amount of the crosslinking delaying agent to include in the crosslinkable aqueous polymer compositions for a desired application.

3. Exemplary Gelable Resin Compositions

Certain exemplary embodiments of the gelable compositions comprise gelable resin compositions that cure to form flexible gels. Unlike the curable resin compositions described below with respect to the consolidating fluids, which cure into hardened masses, the gelable resin compositions cure into flexible, gelled substances that form resilient gelled substances between the particulates of the treated zone of the unconsolidated formation.

Generally, the gelable resin compositions useful in accordance with exemplary embodiments of the present invention comprise a curable resin, a solvent, and a catalyst. When certain catalysts, such as polyamides, are used in the curable resin compositions, the compositions typically may form the semi-solid, gelled substances described above. Where the catalyst used may cause the organic resin compositions to form hard, brittle material rather than the desired gelled substance, the curable resin compositions may further comprise one or more "flexibilizer additives" (described in more detail below) to provide flexibility to the cured compositions.

Examples of gelable resins that can be used in exemplary embodiments of the present invention include organic resins such as polyepoxide resins (e.g., Bisphenol a-epichlorohydrin resins), polyester resins, urea-aldehyde resins, furan resins, urethane resins, and mixtures thereof.

Any solvent that is compatible with the gelable resin and achieves the desired viscosity effect is suitable for use in exemplary embodiments of the present invention. Examples of solvents that may be used in the gelable resin compositions of the present invention include phenols, formaldehydes, furfuryl alcohols, furfurals, alcohols, ethers such as butyl glycidyl ether and cresyl glycidyl etherphenyl glycidyl ether, and combinations thereof. In some embodiments of the present invention, the solvent comprises butyl lactate. The solvent may be used to reduce the viscosity of the gelable resin composition from about 3 to about 3,000 centipoises ("cP") at 80° F. Among other things, the solvent acts to provide flexibility to the cured composition. The solvent may be included in the gelable resin composition in an amount sufficient to provide the desired viscosity effect. Generally, the solvent used is included in the gelable resin composition in amount in the range of from about 5% to about 75% by weight of the curable resin.

Generally, any catalyst that may be used to cure an organic resin is suitable for use in exemplary embodiments of the present invention. Suitable catalysts include internal and external catalysts. When the catalyst chosen is an amide or a polyamide, generally no flexibilizer additive should be required because, inter alia, such catalysts should cause the gelable resin composition to convert into the desired semi-solid, gelled substance. Other suitable catalysts (such as an amine, a polyamine, methylene dianiline, and other curing agents known in the art) will tend to cure into a hard, brittle material and will thus benefit from the addition of a flexibilizer additive. Generally, the catalyst used is included in the gelable resin composition, whether a flexibilizer additive is included or not, in an amount in the range of from about 5% to about 75% by weight of the curable resin. In some exemplary embodiments of the present invention, the catalyst used is included in the gelable resin composition in an amount in the range of from about 20% to about 75% by weight of the curable resin.

As noted above, flexibilizer additives may be used, inter alia, to provide flexibility to the gelled substances formed from the curable resin compositions. Flexibilizer additives may be used where the catalyst chosen would cause the gelable resin composition to cure into a hard and brittle material rather than a desired gelled substance. For example, flexibilizer additives may be used where the catalyst chosen is not an amide or polyamide. Examples of suitable flexibilizer additives include an organic ester, an oxygenated organic solvent, an aromatic solvent, and combinations thereof. Of these, ethers, such as dibutyl phthalate, may be used in certain exemplary embodiments. Where used, the flexibilizer additive may be included in the gelable resin composition in an amount in the range of from about 5% to about 80% by weight of the curable resin. In some embodiments of the present invention, the flexibilizer additive may be included in the curable resin composition in an amount in the range of from about 20% to about 45% by weight of the curable resin.

4. Exemplary Polymerizable Organic Monomer Compositions

Examples of suitable polymerizable organic monomer compositions for use in the sealing compositions generally comprise an aqueous solvent, a water-soluble polymerizable organic monomer, an oxygen scavenger, and a primary initiator. An example of a suitable polymerizable organic monomer composition is Perm-Seal™, which is available from Halliburton Energy Services, Inc. Examples of suitable polymerizable organic monomer compositions are described in U.S. Pat. Nos. 5,358,051 and 5,335,726, the disclosures of which are incorporated herein by reference.

The aqueous solvent component of the polymerizable organic monomer composition generally may be fresh water, salt water, brine, seawater, or any other aqueous liquid that does not adversely react with the other components used in accordance with this invention or with the subterranean formation.

A variety of monomers are suitable for use as the water-soluble polymerizable organic monomers in exemplary embodiments of the present invention. Examples of suitable monomers include acrylic acid, methacrylic acid, acrylamide, methacrylamide, 2-methacrylamido-2-methylpropane sulfonic acid, 2-dimethylacrylamide, vinyl sulfonic acid, N,N-dimethylaminoethylmethacrylate, 2-triethylammoniumethylmethacrylate chloride, N,N-dimethyl-aminopropyl-metnacryl-amide, methacrylamidepropyltriethylammonium chloride, N-vinyl pyrrolidone, vinyl-phosphonic acid, and methacryloyloxyethyl trimethylammonium sulfate, and mixtures thereof. In exemplary embodiments, the water-soluble polymerizable organic monomer may be self-crosslinking. Examples of suitable monomers which are self-crosslinking include hydroxyethylacrylate, hydroxymethylacrylate, hydroxyethylmethacrylate, N-hydroxymethylacrylamide, N-hydroxymethyl-methacrylamide, polyethylene glycol acrylate, polyethylene glycol methacrylate, polypropylene gylcol acrylate, polypropylene glycol methacrylate, and mixtures thereof. Of these, hydroxyethylacrylate may be used in certain exemplary embodiments. One example particular of a suitable monomer is hydroxyethylcellulose-vinyl phosphoric acid.

The water-soluble polymerizable organic monomer (or monomers where a mixture thereof is used) should be included in the polymerizable organic monomer composition in an amount sufficient to form the desired gelled substance after placement of the polymerizable organic monomer composition into the subterranean formation. In some exemplary embodiments of the present invention, the water-soluble polymerizable organic monomer is included in the polymerizable organic monomer composition in an amount in the range of from about 1% to about 30% by weight of the aqueous-base fluid. In another exemplary embodiment of the present invention, the water-soluble polymerizable organic monomer is included in the polymerizable organic monomer composition in an amount in the range of from about 1% to about 20% by weight of the aqueous-base fluid.

The presence of oxygen in the polymerizable organic monomer composition may inhibit the polymerization process of the water-soluble polymerizable organic monomer or monomers. Therefore, an oxygen scavenger, such as stannous chloride, may be included in the polymerizable monomer composition. In order to improve the solubility of stannous chloride so that it may be readily combined with the polymerizable organic monomer composition on the fly, the stannous chloride may be pre-dissolved in a hydrochloric acid solution. For example, the stannous chloride may be dissolved in a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from about 0.1% to about 10% by weight of the polymerizable organic monomer composition. Generally, the stannous chloride may be included in the polymerizable organic monomer composition of an exemplary embodiment of the present invention in an amount in the range of from about 0.005% to about 0.1% by weight of the polymerizable organic monomer composition.

The primary initiator is used, inter alia, to initiate polymerization of the water-soluble polymerizable organic monomer(s) used in an exemplary embodiment of the present invention. Any compound or compounds that form free radicals in aqueous solution may be used as the primary initiator. The free radicals act, inter alia, to initiate polymerization of the water-soluble polymerizable organic monomer present in the polymerizable organic monomer composition. Compounds suitable for use as the primary initiator include alkali metal persulfates, peroxides, oxidation-reduction systems employing reducing agents, such as sulfites in combination with oxidizers, and azo polymerization initiators. Preferred azo polymerization initiators include 2,2'-azobis(2-imidazole-2-hydroxyethyl) propane, 2,2'-azobis(2-aminopropane), 4,4'-azobis(4-cyanovaleric acid), and 2,2'-azobis(2-methyl-N-(2-hydroxyethyl) propionamide. Generally, the primary initiator should be present in the polymerizable organic monomer composition in an amount sufficient to initiate polymerization of the water-soluble polymerizable organic monomer(s). In certain exemplary embodiments of the present invention, the primary initiator is present in the polymerizable organic monomer composition in an amount in the range of from about 0.1% to about 5% by weight of the water-soluble polymerizable organic monomer(s). One skilled in the art will recognize that as the polymerization temperature increases, the required level of activator decreases.

Optionally, the polymerizable organic monomer compositions further may comprise a secondary initiator. A secondary initiator may be used, for example, where the immature aqueous gel is placed into a subterranean formation that is relatively cool as compared to the surface mixing, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some exemplary embodiments of the present invention, the secondary initiator is present in the polymerizable organic monomer composition in an amount in the range of from about 0.1% to about 5% by weight of the water-soluble polymerizable organic monomer(s).

Also optionally, the polymerizable organic monomer compositions of exemplary embodiments of the present invention further may comprise a crosslinking agent for crosslinking the polymerizable organic monomer compositions in the desired gelled substance. In some exemplary embodiments, the crosslinking agent is a molecule or complex containing a reactive transition metal cation, such as, e.g., trivalent chromium cations complexed or bonded to anions, atomic oxygen, or water. Examples of suitable crosslinking agents include compounds or complexes containing chromic acetate and/or chromic chloride. Other suitable transition metal cations include chromium VI within a redox system, aluminum III, iron II, iron III, and zirconium IV. Generally, the crosslinking agent may be present in polymerizable organic monomer compositions in an amount in the range of from 0.01% to about 5% by weight of the polymerizable organic monomer composition.

D. Exemplary Relative-Permeability Modifiers

As described above, fluids that comprise a relative-permeability modifier may be used as the sealing compositions, in accordance with exemplary embodiments of the present invention. While the relative-permeability modifier generally may not plug pore spaces within the treated formation to block flow therethrough, the relative-permeability modifier should adsorb onto surfaces within the formation so as to selectively reduce the formation's water permeability. As such, the formation may be treated with the relative-permeability modifier to form an artificial barrier in the treated formation that at least partially reduces the flow of water therethough.

The relative-permeability modifier should be included in the fluid in an amount sufficient to provide the desired artificial barrier. In one exemplary embodiment, the relative-permeability modifier may be included in the fluid in an amount in the range of from 0.01% to about 10% by weight of the fluid. In another exemplary embodiment, the relative-permeability modifier maybe included in the fluid in an amount in the range of from about 0.1% to about 1% by weight of the fluid.

In general, suitable relative-permeability modifiers may be any compound capable of selectively reducing the effective permeability of a formation to water without a comparable reduction of the formation's effective permeability to hydrocarbons. Those of ordinary skill in the art will appreciate that a variety of different water-soluble polymers may be suitable for use as the relative-permeability modifiers. Examples of suitable water-soluble polymers include homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide quaternary salt derivatives of acrylic acid, and combinations thereof.

In addition, water-soluble polymers suitable for use as relative-permeability modifiers also may include hydrophobically modified polymers. As used in this disclosure, the phrase "hydrophobically modified," or "hydrophobic modification," or any variation thereof, refers to the incorporation into the hydrophilic polymer structure of hydrophobic groups, wherein the alkyl chain length is from about 4 to about 22 carbons. While these hydrophobically modified polymers have hydrophobic groups incorporated into the hydrophilic polymer structure, they should remain water-soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone that comprises polar heteroatoms. Generally, the polar heteroatoms present within the polymer backbone of the hydrophobically modified polymers include, but are not limited to, oxygen, nitrogen, sulfur, or phosphorous.

Exemplary hydrophobically modified polymers may be synthesized utilizing any suitable technique. In one example, the hydrophobically modified polymers may be a reaction product of a hydrophilic polymer and a hydrophobic compound. In another example, the hydrophobically modified polymers may be prepared from a polymerization reaction comprising a hydrophilic monomer and a hydrophobically modified hydrophilic monomer. In general, the hydrophobically modified polymers may be pre-reacted before they are placed into the well bore 10. Alternatively, in certain embodiments, the hydrophobically modified polymers may be prepared by an appropriate in situ reaction. Suitable hydrophobically modified polymers and methods for their preparation are described in more detail in U.S. Pat. Nos. 6,476,169 and 7,117,942, the disclosures of which are incorporated herein by reference. Those of ordinary skill in the art, with the benefit of this disclosure, will be able to determine other suitable methods for the synthesis of suitable hydrophobically modified polymers.

In certain exemplary embodiments of the present invention, suitable hydrophobically modified polymers may be synthesized by the hydrophobic modification of a hydrophilic polymer. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and combinations thereof. Additional examples of alkyl acrylate polymers include polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly(methacrylic acid/dimethylaminopropyl methacrylamide). In certain exemplary embodiments, the hydrophilic polymers comprise a polymer backbone and reactive amino groups in the polymer backbone or as pendant groups, the reactive amino groups capable of reacting with hydrophobic compounds. In some exemplary embodiments, the hydrophilic polymers comprise dialkyl amino pendant groups. In some exemplary embodiments, the hydrophilic polymers comprise a dimethyl amino pendant group and a monomer comprising dimethylaminoethyl methacrylate or dimethylaminopropyl methacrylamide. In certain exemplary embodiments, the hydrophilic polymers comprise a polymer backbone that comprises polar heteroatoms, wherein the polar heteroatoms present within the polymer backbone of the hydrophilic polymers include oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and combinations thereof. In one exemplary embodiment, the starch is a cationic starch. A suitable cationic starch may be formed by reacting a starch, such as corn, maize, waxy maize, potato, tapioca, or the like, with the reaction product of epichlorohydrin and trialkylamine.

The hydrophobic compounds that are capable of reacting with the hydrophilic polymers include alkyl halides, sulfonates, sulfates, organic acids, and organic acid derivatives. Examples of suitable organic acids and derivatives thereof include octenyl succinic acid; dodecenyl succinic acid; and anhydrides, esters, imides, and amides of octenyl succinic acid or dodecenyl succinic acid. In certain exemplary embodiments, the hydrophobic compounds may have an alkyl chain length of from about 4 to about 22 carbons. In another exemplary embodiment, the hydrophobic compounds may have an alkyl chain length of from about 7 to about 22 carbons. In another exemplary embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain exemplary embodiments, suitable hydrophobically modified polymers also may be prepared from a polymerization reaction comprising a hydrophilic monomer and a hydrophobically modified hydrophilic monomer. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present invention. Examples of suitable hydrophilic monomers include acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified polymers useful in exemplary embodiments of the present invention. Examples of suitable hydrophobically modified hydrophilic monomers include alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In another exemplary embodiment, the alkyl groups have from about 7 to about 22 carbons. In another exemplary embodiment, the alkyl groups have from about 12 to about 18 carbons. In certain exemplary embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

Suitable hydrophobically modified polymers that may be formed from the above-described reactions include acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another suitable hydrophobically modified polymer formed from the above-described reaction comprises an amino methacrylate/alkyl amino methacrylate copolymer. A suitable dimethlyaminoethyl methacrylate/alkyl-dimethylammoniumethyl methacrylate copolymer is a dimethylaminoethyl methacrylate/hexadecyl-dimethylammoniumethyl methacrylate copolymer. As previously discussed, these copolymers may be formed by reactions with a variety of alkyl halides. For example, in some exemplary embodiments, the hydrophobically modified polymer may comprise a dimethylaminoethyl methacrylate/hexadecyldimethylammoniumethyl methacrylate bromide copolymer.

III. Exemplary Consolidating Fluids

In accordance with exemplary embodiments, a consolidating fluid may be introduced into a portion of a subterranean formation to consolidate the treated portion of the formation. In general, the consolidating fluid may be any fluid suitable for enhancing the grain-to-grain (or grain-to-formation) contact between particulates in the treated portion of the subterranean formation so that the particulates are stabilized, locked in place, or at least partially immobilized such that they are resistant to flowing with any produced or injected fluids. When placed into the formation, the consolidating fluid should inhibit dislodged fines from migrating with any subsequently produced or injected fluids. Examples of suitable consolidating fluids include tackifying fluids, resin compositions, and gelable compositions. Those of ordinary skill in the art will appreciate that these consolidating fluids are merely exemplary, and the present invention is applicable to other fluids for introduction into the formation to control particulate production.

As previously mentioned, an exemplary embodiment of the consolidating fluids used in the present invention may comprise a tackifying agent. Suitable tackifying agents are substances that are (or may be activated to become) tacky and, thus, impart a degree of consolidation to unconsolidated particulates in the subterranean formation. In this manner, the particulates may be stabilized, locked in place, or at least partially immobilized such that they are resistant to flowing with fluids that are subsequently produced or injected. Suitable tackifying agents may not be significantly tacky when placed into the formation, but may be capable of being "activated" (that is destabilized, coalesced and/or reacted) to transform into a tacky compound at a desirable time. Such activation may occur before, during, or after the introduction of the tackifying fluid into the subterranean formation. Examples of suitable tackifying agents are described in more detail above with respect to the exemplary sealing compositions.

Another example of a consolidating fluid that may be used in an exemplary embodiment of the present invention may comprise a resin. Resins suitable for use may include any resin that is capable of consolidating the treated formation into a hardened, consolidated mass. Examples of suitable resins are described in more detail above with respect to the exemplary sealing compositions.

Another example of a consolidating fluid that may be used in an exemplary embodiment of the present invention comprises gelable compositions. In general, suitable gelable compositions should cure to form a gel. Gelable compositions suitable for use in exemplary embodiments of the present invention include those compositions that cure to form a semi-solid, immovable, gel-like substance. Prior to curing, the gelable compositions should have low viscosities and be capable of flowing in pipe and into the subterranean formation. The gelable composition may be any gelable liquid composition capable of converting into a gelled substance capable of substantially plugging the permeability of the formation while allowing the formation to remain flexible. As referred to in this disclosure, the term "flexible" refers to a state wherein the treated formation is relatively malleable and elastic and able to withstand substantial pressure cycling without substantial breakdown of the formation. Thus, the resultant gelled substance stabilizes the treated portion of the formation while allowing the formation to absorb the stresses created during pressure cycling. As a result, the gelled substance may aid in preventing breakdown of the formation both by stabilizing and by adding flexibility to the treated region. Exemplary gelable compositions are described in more detail above with respect to the exemplary sealing compositions.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of completing a well, comprising:
   introducing a sealing composition into a first portion of a subterranean formation so as to form an artificial barrier to water flow, wherein the artificial barrier is located at or above a hydrocarbon-water interface between a water-bearing formation zone and a hydrocarbon-bearing formation zone;
   separately from the step of introducing a sealing composition, introducing a consolidating fluid into a second portion of the subterranean formation so as to form a consolidated portion of the hydrocarbon-bearing formation zone such that particulates are inhibited from migrating with fluids subsequently produced through the consolidated portion of the hydrocarbon-bearing formation zone,
      wherein the artificial barrier is located between the consolidated portion of the hydrocarbon-bearing formation zone and the water-bearing formation zone and forms a substantially impenetrable barrier for reducing fluid migration between the hydrocarbon-bearing formation zone and the water-bearing formation zone;
      wherein the consolidating fluid comprises a fluid selected from the group consisting of a tackifying fluid, a gelable composition, and a combination thereof; and
      wherein the first portion where the sealing composition was introduced does not contact the second portion where the consolidating fluid was introduced; and
   allowing the sealing composition and the consolidating fluid to remain in the subterranean formation when the well is placed into production.

2. The method of claim 1, wherein a bottom of the artificial barrier is located about ten feet above the hydrocarbon-water interface.

3. The method of claim 1, wherein the sealing composition comprises a fluid selected from the group consisting of a tackifying fluid, a resin composition, a gelable composition, a fluid comprising a relative-permeability modifier, and combinations thereof.

4. The method of claim 1, wherein the sealing composition comprises a non-aqueous tackifying agent selected from the group consisting of a polyamide, a condensation reaction product of one or more polyacids and one or more polyamines, a polyester, a polycarbonate, a polycarbamate, a natural resin, a shellac, and combinations thereof.

5. The method of claim 1, wherein the sealing composition comprises an aqueous tackifying agent selected from the group consisting of an acrylic acid polymer, an acrylic acid ester polymer, an acrylic acid derivative polymer, an acrylic acid homopolymer, an acrylic acid ester homopolymer, a poly(methyl acrylate), a poly (butyl acrylate), a poly_(2-ethylhexyl acrylate), an acrylic acid ester copolymer, a methacrylic acid derivative polymer, a methacrylic acid homopolymer, a methacrylic acid ester homopolymer, a poly(methyl methacrylate), a poly(butyl methacrylate), a poly(2-ethylhexyl methacrylate), an acrylamido-methyl-propane sulfonate polymer, an acrylamido-methyl-propane sulfonate derivative polymer, an acrylamido-methyl-propane sulfonate copolymer, an acrylic acid/acrylamido-methyl-propane sulfonate copolymer, a benzyl coco di-(hydroxyethyl) quaternary amine, a p-T-amyl-phenol condensed with formaldehyde, a copolymer comprising from about 80% to about 100% $C_{1-30}$ alkylmethacrylate monomers and from up to about 20% hydrophilic monomers, and combinations thereof.

6. The method of claim 1, wherein the sealing composition comprises a resin selected from the group consisting of a two-component epoxy based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin, a hybrid of a polyester resin, a copolymer of a polyester resin, a polyurethane resin, a hybrid of a polyurethane resin, a copolymer of a polyurethane resin, an acrylate resin, and combinations thereof.

7. The method of claim 1, wherein the sealing composition comprises a gelable composition selected from the group consisting of a gelable aqueous silicate composition, a crosslinkable aqueous polymer composition, a gelable resin composition, a polymerizable organic monomer composition, and combinations thereof.

8. The method of claim 1, wherein the sealing composition comprises an aqueous alkali metal silicate solution and a catalyst.

9. The method of claim 1, wherein the sealing composition comprises an aqueous solvent, a crosslinkable polymer, and a crosslinking agent.

10. The method of claim 1, wherein the sealing composition comprises a gelable resin composition comprising a resin selected from the group consisting of an organic resin, a polyepoxide resin, a polyester resin, a urea-aldehyde resin, a furan resin, a urethane resin, and combinations thereof.

11. The method of claim 10, wherein the gelable resin composition comprises a flexibilizer additive selected from the group consisting of an organic ester, an oxygenated organic solvent, an aromatic solvent, and combinations thereof.

12. The method of claim 1, wherein the sealing composition comprises an aqueous solvent, a water-soluble polymerizable organic monomer, an oxygen scavenger, and a primary initiator.

13. The method of claim 1, wherein the sealing composition comprises a fluid comprising a relative permeability modifier selected from the group consisting of homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, a quaternary salt derivative of acrylamide and a quaternary salt derivative of acrylic acid, and combinations thereof.

14. The method of claim 1, wherein the sealing composition comprises a fluid comprising a hydrophobically modified polymer selected from the group consisting of a hydrophobically modified polyacrylamide, a hydrophobically modified polyvinylamine, a hydrophobically modified poly(vinylamine/vinyl alcohol), a hydrophobically modified alkyl acrylate polymer, a hydrophobically modified cellulose, a hydrophobically modified chitosan, a hydrophobically modified polyamide, a hydrophobically modified polyetheramine, a hydrophobically modified polyethyleneimine, a hydrophobically modified polyhydroxyetheramine, a hydrophobically modified polylysine, a hydrophobically modified polysulfone, a hydrophobically modified gum, a hydrophobically modified starch, and combinations thereof.

15. The method of claim 1, wherein the consolidating fluid comprises a fluid selected from the group consisting of a tackifying fluid, a resin composition, a gelable composition, and combinations thereof.

16. The method of claim 1, wherein the consolidating fluid comprises a non-aqueous tackifying agent selected from the group consisting of a polyamide, a condensation reaction product of one or more polyacids and one or more polyamines, a polyester, a polycarbonate, a polycarbamate, a natural resin, a shellac, and combinations thereof.

17. The method of claim 1, wherein the consolidating fluid comprises an aqueous tackifying agent selected from the group consisting of an acrylic acid polymer, an acrylic acid ester polymer, an acrylic acid derivative polymer, an acrylic acid homopolymer, an acrylic acid ester homopolymer, a poly(methyl acrylate), a poly (butyl acrylate), a poly_(2-ethylhexyl acrylate), an acrylic acid ester copolymer, a methacrylic acid derivative polymer, a methacrylic acid homopolymer, a methacrylic acid ester homopolymer, a poly (methyl methacrylate), a poly(butyl methacrylate), a poly(2-ethylhexyl methacrylate), an acrylamido-methyl-propane sulfonate polymer, an acrylamido-methyl-propane sulfonate derivative polymer, an acrylamido-methyl-propane sulfonate copolymer, an acrylic acid/acrylamido-methyl-propane sulfonate copolymer, a benzyl coco di-(hydroxyethyl) quaternary amine, a p-T-amyl-phenol condensed with formaldehyde, a copolymer comprising from about 80% to about 100% $C_{1-30}$ alkylmethacrylate monomers and from up to about 20% hydrophilic monomers, and combinations thereof.

18. The method of claim 1, wherein the consolidating fluid comprises a resin selected from the group consisting of a two-component epoxy based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin, a hybrid of a polyester resin, a copolymer of a polyester resin, a polyurethane resin, a hybrid of a polyurethane resin, a copolymer of a polyurethane resin, an acrylate resin, and combinations thereof.

19. The method of claim 1, wherein the consolidating fluid comprises a gelable composition selected from the group consisting of a gelable aqueous silicate composition, a crosslinkable aqueous polymer composition, a gelable resin composition, a polymerizable organic monomer composition, and combinations thereof.

20. The method of claim 1, wherein the consolidating fluid comprises a gelable resin composition comprising a resin selected from the group consisting of an organic resin, a polyepoxide resin, a polyester resin, a urea-aldehyde resin, a furan resin, a urethane resin, and combinations thereof.

21. The method of claim 1, wherein the consolidating fluid comprises a flexibilizer additive selected from the group consisting of an organic ester, an oxygenated organic solvent, an aromatic solvent, and combinations thereof.

22. The method of claim 1, wherein consolidating the portion of the subterranean formation comprises consolidating particulates within the hydrocarbon-bearing formation zone so that the particulates are inhibited from migrating with any subsequently produced fluids.

23. A method of completing a well for controlling water and particulate production, the method comprising:
identifying a hydrocarbon-water interface between a hydrocarbon-bearing formation zone and a water-bearing formation zone;
perforating a first interval of a casing;
introducing a sealing composition into one or more subterranean formations surrounding the first interval to form an artificial barrier to water flow, wherein the artificial barrier is located either at or above the hydrocarbon-water interface and wherein the artificial barrier is substantially impenetrable so as to inhibit fluid migration between the hydrocarbon-bearing formation zone and the water-bearing formation zone;

perforating a second interval of the casing, wherein the second interval is located above the first interval;

separately from the step of introducing a sealing composition, introducing a consolidating fluid into one or more subterranean formations surrounding the second interval so as to consolidate at least a portion of the one or more subterranean formations such that particulates are inhibited from migrating with fluids subsequently produced through the consolidated portion of the subterranean formation; and wherein the first interval where the sealing composition was introduced does not contact the second interval where the consolidating fluid was introduced; and allowing the sealing composition and the consolidating fluid to remain in the subterranean formation when the well is placed into production.

24. The method of claim 23, wherein a bottom of the artificial barrier is located about ten feet above the hydrocarbon-water interface.

25. The method of claim 23, wherein the sealing composition penetrates in the range of from about 5 feet to about 50 feet into the one or more subterranean formations.

26. The method of claim 23, wherein the sealing composition comprises a fluid selected from the group consisting of a tackifying fluid, a resin composition, a gelable composition, a fluid comprising a relative-permeability modifier, and combinations thereof.

27. The method of claim 23, wherein the consolidating fluid comprises a fluid selected from the group consisting of a tackifying fluid, a resin composition, a gelable composition, and combinations thereof.

28. The method of claim 23, wherein the consolidated portion of the one or more subterranean formations comprises particulates that are inhibited from migrating with any subsequently produced fluids.

29. The method of claim 23, wherein the one or more subterranean formations into which the consolidating fluid is introduced and the one or more subterranean formations into which the sealing composition is introduced are the same or different formations.

30. The method of claim 29, wherein the hydrocarbon-bearing formation zone comprises the one or more subterranean formations into which the consolidating fluid is introduced.

31. The method of claim 23, comprising at least one step selected from the group of creating or enhancing one or more propped fractures through the consolidated portion of the one or more subterranean formations, introducing an after-flush fluid into the consolidated portion of the subterranean formation to at least partially restore effective permeability to the consolidated portion, introducing a pre-flush fluid into the one or more subterranean formations surrounding the second interval prior to the introduction of the consolidating fluid, shutting in the well bore after the step of introducing the consolidating fluid, and combinations thereof.

32. A method of completing a well for controlling water and particulate production, the method comprising:
identifying a hydrocarbon-water interface between a hydrocarbon-bearing formation zone and a water-bearing formation zone;
perforating a first interval of a casing;
introducing a sealing composition into one or more subterranean formations surrounding the first interval to form an artificial barrier to water flow, wherein the artificial barrier is located either at or above the hydrocarbon-water interface;
perforating a second interval of the casing, wherein the second interval is located above the first interval;
separately from the step of introducing a sealing composition, introducing a consolidating fluid into one or more subterranean formations surrounding the second interval so as to consolidate at least a portion of the one or more subterranean formations:
wherein the consolidating fluid is introduced into the one or more subterranean formations prior to the introduction of the sealing composition into the one or more subterranean formations; and,
wherein the first interval where the sealing composition was introduced does not contact the second interval where the consolidating fluid was introduced; and
allowing the sealing composition and the consolidating fluid to remain in the subterranean formation when the well is placed into production.

33. A method of completing a well for controlling water and particulate production, the method comprising:
positioning a jetting tool at a first location in a well bore;
perforating a first interval of casing at the first location, the perforating comprising using the jetting tool to form one or more perforations that penetrate through the casing;
introducing a sealing composition through the jetting tool and into one or more subterranean formations surrounding the first interval to form a substantially impenetrable barrier to water flow, wherein either the artificial barrier is adjacent to a hydrocarbon-water interface between a hydrocarbon-bearing formation zone and a water-bearing formation zone, or a bottom of the artificial barrier is located no more than about ten feet above the hydrocarbon-water interface;
positioning the jetting tool in the well bore at a second location above the first location;
perforating a second interval of casing at the second location in the well bore, the perforating comprising using the jetting tool to form one or more perforations that penetrate through the casing;
separately from the step of introducing a sealing composition, introducing a consolidating fluid through the jetting tool and into one or more formations surrounding the second interval so as to consolidate at least a portion of the one or more subterranean formations such that particulates are inhibited from migrating with fluids subsequently produced through the consolidated portion of the hydrocarbon-bearing formation zone; and,
wherein the first interval where the sealing composition was introduced does not contact the second interval where the consolidating fluid was introduced; and
allowing the sealing composition and the consolidating fluid to remain in the one or more subterranean formations when the well is placed into production.

34. The method of claim 33, comprising jetting a fluid through the jetting tool and into the consolidated portion of the one or more subterranean formations and pumping a fluid down through an annulus between the casing and a work string coupled to the jetting tool and into the consolidated portion such that one or more propped fractures through the consolidated portion are created or enhanced.

* * * * *